US006968908B2

(12) United States Patent
Tokunaga et al.

(10) Patent No.: US 6,968,908 B2
(45) Date of Patent: Nov. 29, 2005

(54) POWER TOOLS

(75) Inventors: Manabu Tokunaga, Anjo (JP); Goshi Ishikawa, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/772,094

(22) Filed: Feb. 4, 2004

(65) Prior Publication Data

US 2004/0182588 A1 Sep. 23, 2004

(30) Foreign Application Priority Data

Feb. 5, 2003 (JP) ............................ 2003-028709
Feb. 14, 2003 (JP) ............................ 2003-036402

(51) Int. Cl.[7] ................................................ B23Q 5/00
(52) U.S. Cl. ....................................... 173/181; 173/183
(58) Field of Search ............................ 173/117, 162.1, 173/170, 181, 200, 132.1, 183; 700/275, 700/281, 301

(56) References Cited

U.S. PATENT DOCUMENTS

| | | | | |
|---|---|---|---|---|
| 3,590,582 | A * | 7/1971 | German et al. | 60/394 |
| 4,305,471 | A * | 12/1981 | Eshghy | 173/183 |
| 4,316,512 | A * | 2/1982 | Kibblewhite et al. | 173/183 |
| 4,685,050 | A * | 8/1987 | Polzer et al. | 700/32 |
| 5,154,242 | A * | 10/1992 | Soshin et al. | 173/178 |
| 5,285,857 | A * | 2/1994 | Shimada | 173/1 |
| 5,289,885 | A * | 3/1994 | Sakoh | 173/2 |
| 5,457,866 | A | 10/1995 | Noda | 29/407 |
| 5,631,823 | A * | 5/1997 | Layer et al. | 700/50 |
| 6,311,786 | B1 * | 11/2001 | Giardino et al. | 173/1 |
| 6,371,218 | B1 | 4/2002 | Amano et al. | 173/183 |
| 6,460,629 | B2 * | 10/2002 | Bookshar et al. | 173/176 |
| 2002/0175656 | A1 | 11/2002 | Matsunaga | |

FOREIGN PATENT DOCUMENTS

| | | | |
|---|---|---|---|
| JP | 57-201177 | 12/1982 | B25B 23/147 |
| JP | 06-206172 | 7/1994 | B25B 23/151 |
| JP | 08-290368 | 11/1996 | B25B 23/151 |
| JP | 2000-210877 | 8/2000 | B25B 21/02 |
| JP | 2001-277146 | 10/2001 | B25B 23/14 |
| JP | 2001-341079 | 12/2001 | B25B 23/14 |
| JP | 2002-154063 | 5/2002 | B25B 21/02 |

* cited by examiner

*Primary Examiner*—Stephen F. Gerrity
*Assistant Examiner*—Chukwurah Nathaniel
(74) *Attorney, Agent, or Firm*—Orrick Herrington & Sutcliffe, LLP

(57) ABSTRACT

Power tool (11) may include a motor and oil pulse unit (22) that generates an elevated torque. Oil pulse unit (22) may be coupled to the motor and have output shaft (18). When load acting on output shaft (18) is less than a predetermined value, rotating torque generated by the motor is directly transmitted to output shaft (18). When the load acting on output shaft (22) exceeds the predetermined value, an elevated torque is generated by oil pulse unit (22) and applied to output shaft (18). Output shaft (18) may be connected to load shaft (12). A socket may be attached to the distal end of load shaft (12). Power tool (11) may further include detecting device (20) for detecting change in rotational angle of output shaft (18) and the direction of rotation thereof, and a control device. The detecting device (20) may output signals corresponding to a state of output shaft (18) to the control device. The control device may store the state of output shaft (18) at predetermined interval. Preferably, the control device may further determine a generating time, at which oil pulse unit (22) generates the elevated torque, based upon the state of output shaft (18).

18 Claims, 15 Drawing Sheets

| | R1 | R2 | R3 | R4 | R5 | R6 | R7 | R8 | R9 | R10 |
|---|---|---|---|---|---|---|---|---|---|---|
| Example | 00 | 00 | 00 | 01 | 01 | 00 | 00 | FF | 00 | 00 |

POWER TOOLS

CROSS REFERENCE

This application claims priority to Japanese patent application number 2003-28709, filed Feb. 5, 2003, and Japanese patent application number 2003-36402, filed Feb. 14, 2003, each of which are incorporated herein by reference as if fully set forth herein.

BACKGROUND OF THE INVENTION

1. Field of the Invention

The present invention relates to power tools and more particularly, relates to power tools, such as impact wrenches and impact screwdrivers.

2. Description of the Related Art

Japanese Laid-open Patent Publication No. 6-304879 describes an impact wrench that can be used firmly tighten fasteners, such as a bolt or nut This known impact wrench has an output shaft (drive shaft) and a hammer that strikes the output shaft. Generally speaking, a socket is attached to a distal end of the output shaft A fastener may be disposed within the socket. Then, the output shaft is forcibly rotated in order to tighten the fastener within or to a workpiece. The hammer is allowed to slip and freely rotate with respect to the output shaft when a predetermined amount of torque is exerted. Thus, when a load for rotating the output shaft is light (i.e., before the fastener becomes seated against the workpiece), the hammer continuously rotates the output shaft in order to continuously tighten the fastener. However, after the head of the fastener has contacted the workpiece (i.e., after the fastener has become seated against the workpiece), the hammer will begin to slip and rotate freely. Therefore, the hammer will impact the output shaft after rotating by predetermined angle. By repetition of the slipping and impacting action, the output shaft will rotate a small amount each time the hammer impacts the output shaft and the fastener can be tightened to an appropriate torque.

This known impact wrench further includes an impact detecting sensor that detects whether the hammer is distant from the output shaft (i.e., whether the hammer slips with respect to the output shaft), and a rotational angle detecting sensor that measures the rotational angle of the output shaft The impact detecting sensor outputs an OFF signal when the hammer is in an engaged state with the output shaft, and outputs an ON signal when the hammer is distant from the output shaft. The rotational angle detecting sensor outputs a signal that corresponds to the rotational angle of the output shaft. A controller of the impact wrench detects changes in the rotational angle of the output shaft in the period between the impact detecting sensor outputting one ON signal and outputting a subsequent ON signal, and determines from the changes in the rotational angle of the output shaft whether the tightening torque of the fastener has reached a predetermined value (i.e., whether the fastener has become seated against the workpiece). When the tightening torque reaches, the predetermined value, the controller begins to detect changes in the rotational angle of the output shaft from that point in time again. When the detected changes in the rotational angle reach a preset value, the motor is stopped. Consequently, after the fastener has become seated against the workpiece, the fastener is further tightened until the changes in the rotational angle reach the preset value. As a result the fastener can reliably be tightened by means of this impact wrench.

SUMMARY OF THE INVENTION

However, the known impact wrench must have not only the rotational angle detecting sensor for measuring the rotational angle of the output shaft, but also the impact detecting sensor for detecting that the hammer has struck the output shaft. That is, a small amount of play usually exists between the socket and the fastener. Therefore, when the output shaft tightens the fastener, a cycle (repetition) of normal rotation (rotation in a tightening direction) and reverse rotation (rotation in a loosening direction) is typically repeated due to a reaction (hammering action) that is produced when the impact force of the output shaft is transmitted to the fastener. Consequently, the socket (i.e., output shaft) of the impact wrench may continue repeat the cycle of normal rotation and reverse rotation due to the hammering action. In the known impact wrench, this continual rotation means that the rotational angle detecting sensor alone cannot reliably detect at which time the hammer struck the output shaft As a result, the known impact wrench must include the impact detecting sensor.

It is, accordingly, one object of the present teachings to provide improved power tools that can adequately and appropriately tighten fasteners using only a rotational angle detecting means.

In one aspect of the present teachings, power tools may include a motor, such as an electric or pneumatic motor, and an oil pulse unit that generates an elevated torque (i.e., oil pulse). The oil pulse unit may be coupled to the motor and have an output shaft. When a load acting on the output shaft is less than a predetermined value, rotating torque generated by the motor is directly transmitted to the output shaft. When the load acting on the output shaft exceeds the predetermined value, an elevated torque is generated by the oil pulse unit and applied to the output shaft. The output shaft may be connected to a load shaft. A socket for engaging fasteners (e.g., bolt nut or screw) may be attached to the load shaft. The load shaft is preferably rotated in order to tighten the fastener within or to a workpiece.

Such power tools may also include a detecting device for detecting change in rotational angle of the output shaft (or the load shaft) and the direction of rotation thereof such as a rotary encoder, and a control device, such as a processor, microprocessor or microcomputer. The detecting device may output signals corresponding to a state of the output shaft (or the load shaft) to the control device. The control device may store the state of the output shaft (or the load shaft) within a memory at predetermined interval.

Preferably, the control device may further determine a generating time, at which the oil pulse unit generates the elevated torque, based upon the state of the output shaft (or the load shaft). For example, when change in the rotational angle of the output shaft (or the load shaft) has occurred, the control device first calculates the changes in the rotational angle of the output shaft (or the load shaft) in the tightening direction during a first predetermined period extending from a time prior to the change in the rotational angle until the change in the rotational angle occurs. When the calculated changes in the rotational angle are within a first predetermined value, it can be determined that the output shaft (the load shaft) has substantially stopped rotating. Therefore, when the calculated changes in the rotational angle are within a first predetermined value (i.e., the output shaft (the load shaft) has substantially stopped rotating), the control device further calculates the absolute value of the changes in the rotational angle of the output shaft (the load shaft) in a period lasting from the change in the rotational angle until a second predetermined period has elapsed. If the absolute value of the changes in the rotational angle is greater than a second predetermined value, the control device determines that the time at which the change in the rotational angle was occurred corresponds to a time at which an oil pulse was generated by the oil pulse unit. By contrast, when the absolute value of the changes in the rotational angle is less than the second predetermined value, the control device determines that the time at which the change in the rotational angle was occurred was not a time at which an oil pulse was generated by the oil pulse unit. By this means, the control device can determine, using only the signals from the detecting device, whether the current state is one where the oil pulse was applied to the output shaft Generally speaking, the changes in the rotational angle of the output shaft (the load shaft) in the tightening direction per one oil pulse differs greatly depending on whether this occurs before or after seating the fastener That is, there are large changes in the rotational angle of the output shaft (load shaft) before the fastener is seated, and small changes in the rotational angle of the output shaft (load shaft) after the fastener is seated. As a result, it is possible to determine whether the fastener has been seated by determining the extent by which the rotational angle of the output shaft changes per one oil pulse.

Thus, in another aspect of the present teachings, the control device may further determine whether the fastener has reached the seated position against the workpiece based upon the state of the output shaft (the load shaft). For example, the control device may calculates the changes in the rotational angle of the output shaft (the load shaft) in the tightening direction from the time, at which an oil pulse was generated by the oil pulse unit, until a predetermined period has elapsed. Then, the control device may determine whether the fastener has reached a seated position against the workpiece based upon the calculated changes in the rotational angle. Specifically, when the calculated changes in the rotational angle is within the third predetermined value, the control device may determine that the fastener has reached a seated position against the workpiece. Preferably, the control device may stop the motor when a predetermined time has elapsed after determining that the fastener has reached the seated position against the workpiece. Therefore, the fastener can be adequately and appropriately tightened.

In another embodiment of the present teachings, power tools may include a hammer that is adapted to strike an anvil to thereby rotate the anvil and generate the elevated torque. If the hammer and the anvil are utilize to generate elevated torque, instead of an oil pulse, the control device is preferably programmed to count the number of impact of the hammer striking the anvil after the fastener has reached the seated position against the workpiece, For example, when the number of impacts reaches a predetermined or preset number, the motor is automatically stopped.

In another aspect of the present teachings, power tools are taught that are capable of tightening fasteners using a sufficient or adequate tightening torque, even if fasteners are tightened within or to several type of workpieces. Generally speaking, even if same fasteners are tightened using same auto stop conditions (e.g., same motor driving period after seating, same number of impacts after seating), the tightening torque of the fastener changes if the type of workpiece (e.g., the material (hardness) of workpiece) differs. Usually, the appropriate tightening torque of the fastener is determined by the type of fastener and not by the type of workpiece, such that if the fasteners are same, the appropriate tightening torque values are same. In consequence, if same fasteners are to be tightened to differing workpiece with the appropriate tightening torque, the auto stop conditions must be changed to correspond to the type of workpiece.

Thus, in one embodiment of the present teachings, the power tools may have automatic stop programs for automatically stopping the motor for each of differing types of workpiece. Preferably, the control device may determine the type of workpiece based upon the signals from the detecting device. For example, the control device may (1) calculate a cumulative rotational angle of the output shaft (the load shaft) in the tightening direction within a predetermined period after the fastener has reached the seated position against the workpiece, and (2) determine the type of workpiece based upon the calculated cumulative rotational angle. Alternately, the control device may (1) calculate average changes in rotational angle of the output shaft (the load shaft) in the tightening direction per one elevated torque after the fastener has reached the seated position against the workpiece, and (2) determine the type of workpiece based upon the calculated average changes When the control device determines the type of workpiece, the control device may select the automatic stop program based upon the determined type of workpiece, and stop the motor in accordance with the selected automatic stop program. As a result, since the control device automatically chooses the automatic stop programs that correspond to the type of workpiece, the fastener can be tightened with the appropriate tightening torque.

These aspects and features may be utilized singularly or, in combination, in order to make improved power tool. In addition, other objects, features and advantages of the present teachings will be readily understood after reading the following detailed description together with the accompanying drawings and claims. Of course, the additional features and aspects disclosed herein also may be utilized singularly or, in combination with the above-described aspect and features.

DETAILED DESCRIPTION OF THE INVENTION

First Detailed Representative Embodiment

Figure 1:
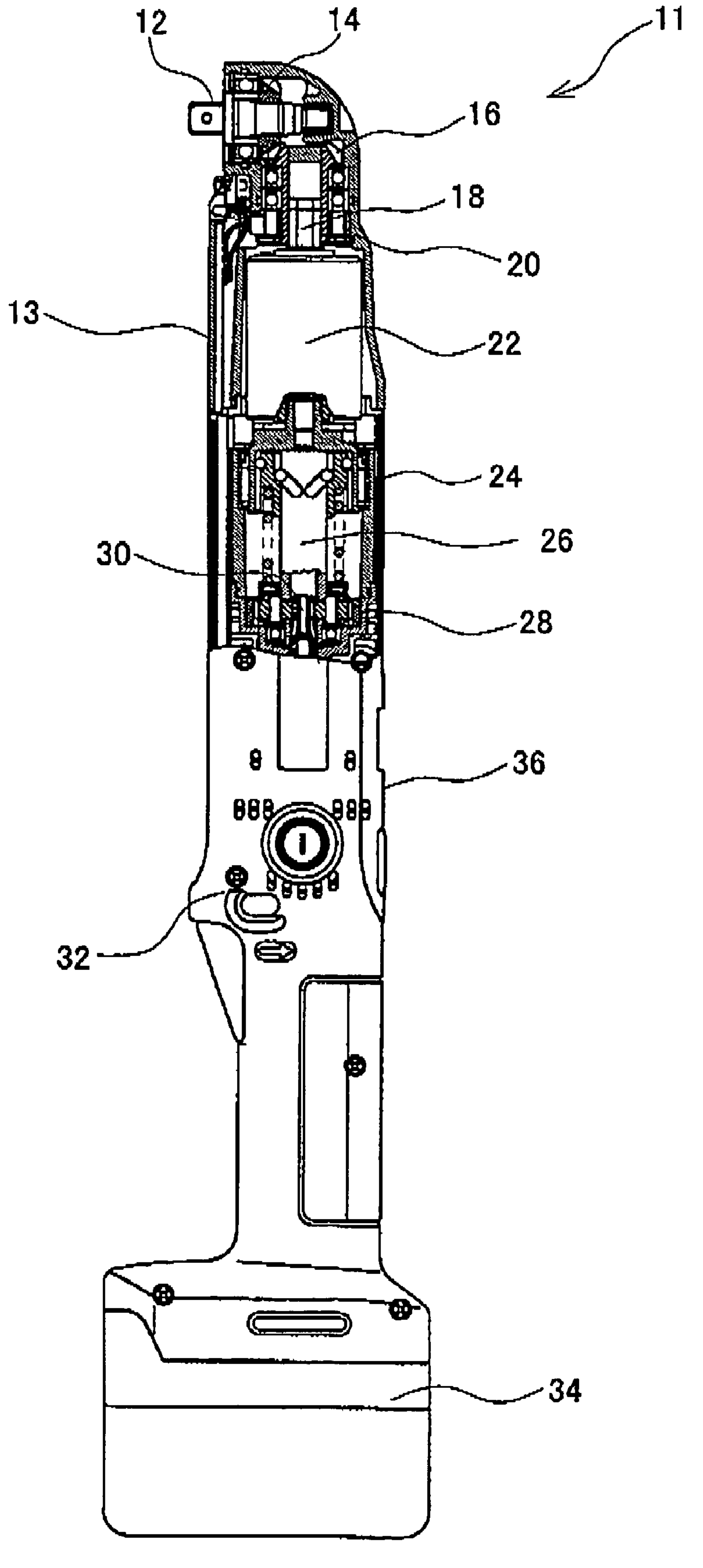
FIG. 1 is a partial cross-sectional view showing a right angle, soft impact wrench according to a first representative embodiment of the present teachings.

A soft impact wrench according to a first representative embodiment of the present teachings will be explained with reference to drawings. FIG. 1 shows a first representative embodiment of the present teachings, which is right-angle soft impact wrench 11 having a motor (not shown in FIG. 1, but shown as motor M in FIG. 6) tat is disposed within housing 13. Planetary gear mechanism 28 is connected to output shaft 30, which is coupled to motor M. Oil pulse unit 22 is connected to output shaft 26 of planetary gear mechanism 28 via cushioning mechanism 24.

Oil pulse unit 22 is a known device that causes output shaft 18 to instantaneously produce a large impact force (oil pulse) by using the pressure of the oil that is disposed within oil pulse unit 22. The impact force can be controlled by adjusting the maximum pressure of the oil disposed within oil pulse unit 22. Thus, a predetermined tightening torque can be produced. Cushioning mechanism 24 may be, e.g., a known mechanism (e.g., described in Japanese Unexamined Utility Model No. 7-31281) for preventing the impact force, which is produced by the oil pulse, from being directly transmitted to planetary gear mechanism 28.

Output shaft 18 of oil pulse unit 22 is rotatably supported by bearing device 20, and bevel gear 16 is disposed on a distal end of output shaft 18. Bevel gear 16 engages another bevel gear 14, which is disposed on one end of spindle 12. Spindle 12 is rotatably supported perpendicular to output shaft 18 (i.e., thereby defining a “right-angle” impact wrench). A socket (not shown) may be utilized to engage the head of a fastener and may be fixedly or removably attached to the other end of spindle 12.

When motor M rotates, the output rotational speed of motor M is reduced by planetary gear mechanism 28 and the reduced output rotational speed is transmitted to oil pulse unit 22. In oil pulse unit 22, the load on spindle 12 (output shaft 18) is low at the initial stage of tightening. Therefore, the rotational energy generated by motor M is directly transmitted to spindle 12 without generating an oil pulse. As a result, spindle 12 will continuously rotate, thereby continuously tightening the fastener. On the other hand, after the fastener has been substantially tightened, the load on spindle 12 (output shaft 18) will increase. At that time, oil pulse unit 22 will generate oil pulses in order to produce an elevated torque and more firmly tighten the fastener using the impact force generated by the oil pulses.

Figure 2:
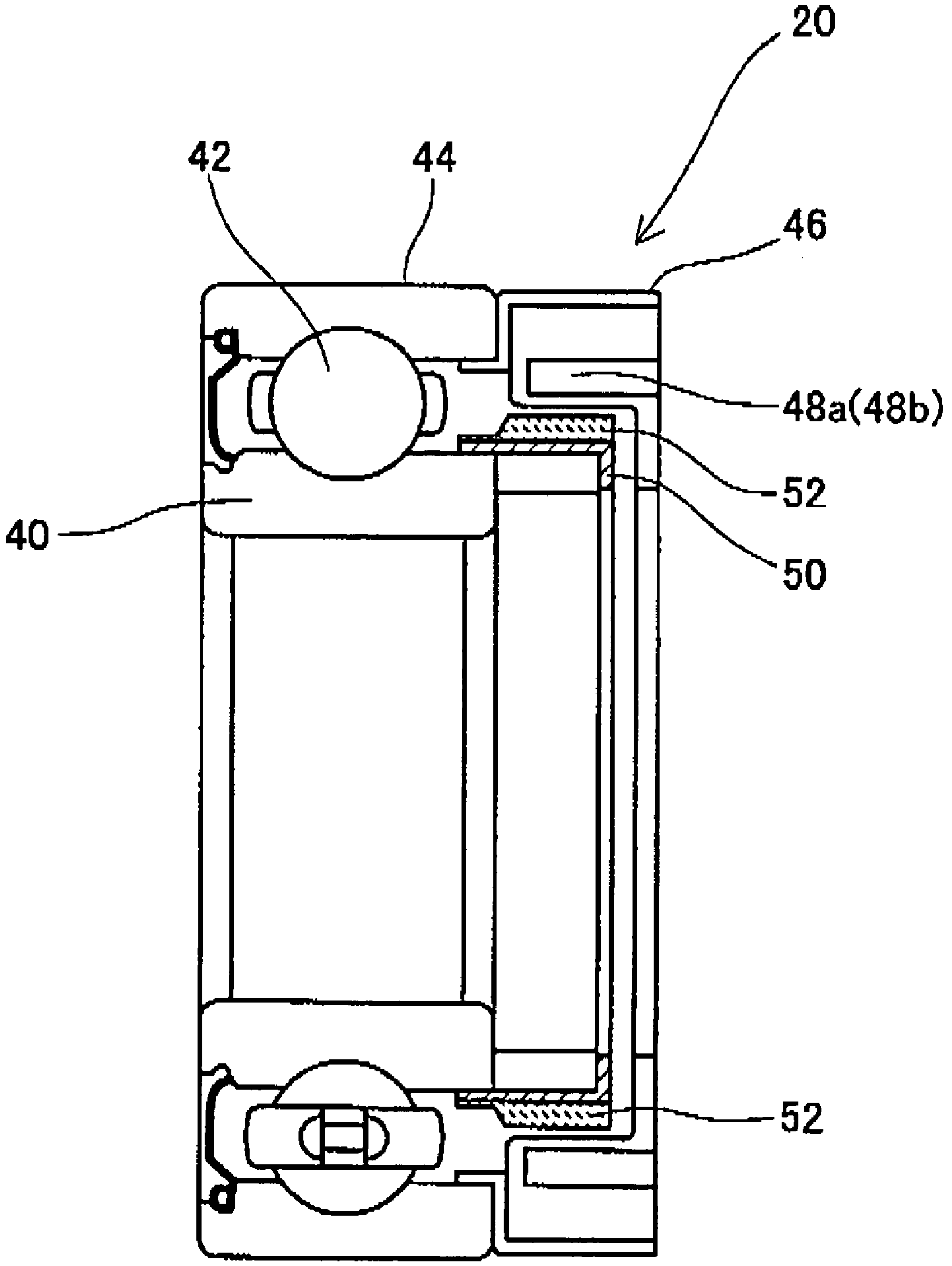
FIG. 2 is a cross-sectional view showing the structure of a representative bearing device.

Representative bearing device 20 will be further explained with reference to FIGS. 2–5. Bearing device 20 rotatably supports output shaft 18 of oil pulse unit 22, which is actuated in the above-described manner. FIG. 2 is a cross-sectional view showing a representative structure for bearing device 20. As shown in FIG. 2, bearing device 20 may include outer cylinder 44, which freely and rotatably supports inner cylinder 40. A through-bole may be defined within inner cylinder 40. The diameter of the through-hole is preferably substantially the same as outside diameter of output shaft 18 of oil pulse unit 22 (i.e., slightly smaller than the outside diameter of output shaft 18). Output shaft S18 of oil pulse unit 22 is firmly inserted into the through-hole from the right side, as viewed in FIG. 2. Thus, inner cylinder 40 is affixed onto output shaft 18. Accordingly, when output shaft 18 rotates, inner cylinder 40 integrally rotates with output shaft 18.

Figure 3:
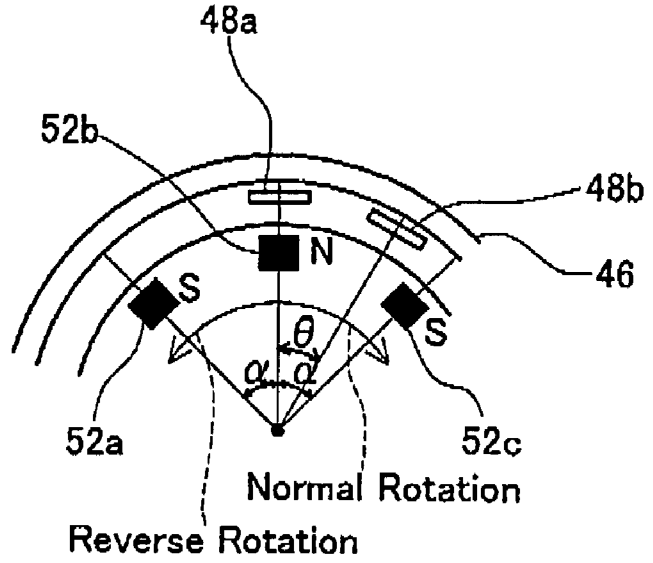
FIG. 3 schematically shows the positional relationships between magnets, which disposed within the representative bearing device shown in FIG. 2, and sensors.

Magnet mounting member 50 may have a cylindrical shape and may be affixed onto the right side of inner cylinder 40, as shown in FIG. 2. A plurality of permanent magnets 52 (i.e., indicated by reference numerals 52*a*, 52*b*, 52*c* in FIG. 3) may be disposed at regular intervals around the outer circumferential (peripheral) surface of magnet mounting member 50. FIG. 3 schematically shows a representative positional relationship between magnets 52, which are disposed within the bearing device 20, and rotational angle detecting sensors, 48*a* and 48*b*.

As shown in FIG. 37 magnets 52 may be divided into two groups. One group consists of magnets 52*a*, 52*c*, etc., which are disposed such that their respective South poles face outward, The other group consists of magnet(s) 52*b*, etc., which are disposed such that their respective North poles face outward. That is, the South poles and the North poles are alternately disposed outward. The angle a is defined between adjacent magnets. In other words, the angle $\alpha$ is defined by a line connecting the center of magnet 52*a* and the rotational center of inner cylinder 40 and a line connecting the center of magnet 52*b* and the rotational center of inner cylinder 40, as shown in FIG. 3.

Referring back to FIG. 2, outer cylinder 44 is a cylindrical member having an inner diameter that is greater than the outer diameter of inner cylinder 40. A plurality of bearing balls 42 is disposed between inner cylinder 40 and outer cylinder 44 in order to rotatably support inner cylinder 40 relative to outer cylinder 44. Therefore, when outer cylinder 44 is accommodated and affixed within housing 13, inner cylinder 40 (i.e., output shaft 18) is rotatably supported relative to outer cylinder 44 (i.e., housing 13).

Sensor mounting member 46 may have a cylindrical shape and may be affixed to the right side of outer cylinder 44, as viewed in FIG. 2. Rotational angle detecting sensors 48*a*, 48*b* may be disposed on the internal wall of sensor mounting member 46. Preferably, sensors 48*a*, 48*b* are disposed so as to face magnets 52 (see FIG. 3).

Each rotational angle detecting sensor 48*a*, 48*b* may be a latch type Hall IC, which detects changes in magnetic fields. According to the detected changes of the magnetic field, each sensor 48*a*, 48*b* switches the state (e.g., voltage level) of a detection signal that is outputted, e.g., to microcomputer 60 (see FIG. 6). For example, rotational angle detecting sensors 48*a*, 48*b* may each include a Hall element, which serves as a magnetic sensor, and an IC, which converts output signals from the Hall element into digital signals. For example, when a North-pole magnetic field is applied to each sensor 48*a*, 48*b*, the signal output from the sensor may be switched to a HIGH level. When a South-pole magnetic field is applied to each sensor 48*a*, 48*b*, the signal output from the sensor may be switched to a LOW level.

Figure 4:
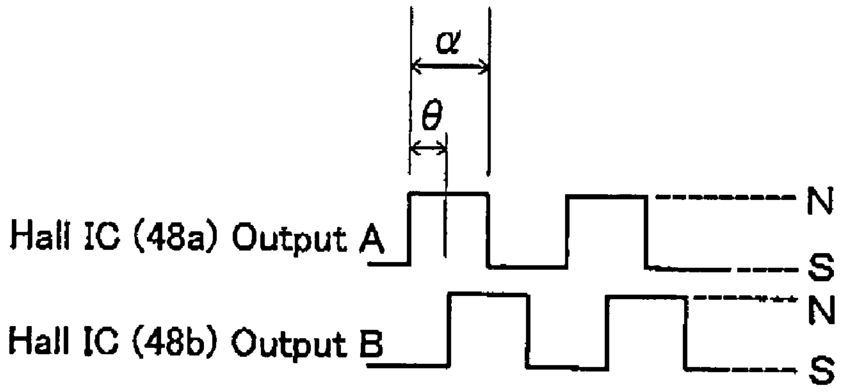
FIG. 4 is a diagram showing the timing of outputted detection signals that are respectively supplied from sensors when an output shaft is rotated in a normal direction.

Rotational angle detecting sensors 48*a*, 48*b* may be displaced from each other by angle θ, as shown in FIG. 3. In this case, when inner cylinder 40 (i.e., output shaft 18) rotates in the normal direction (i.e., a forward or tightening direction), the detection signals that are respectively output from rotational angle detecting sensors 48*a*, 48*b* change as shown in FIG. 4. FIG. 4 shows the timings of the outputs of detection signals that are supplied from two corresponding rotational angle-detecting sensors 48*a*, 48*b* when output shaft 18 rotates normally (i.e., in the forward direction). For convenience of explanation, the detection signals that are output from rotational angle detection sensors 48*a*, 48*b* are switched to the LOW level when magnets 52*a*, 52*c*, etc., whose South-poles are disposed outward, face or directly oppose sensors 48*a*, 48*b*, and to the HIGH level when magnet(s) 52*b*, etc., whose North-poles are disposed outward, face or directly oppose sensors 48*a*, 48*b*.

For purposes of illustration, rotational angle detecting sensors 48*a*, 48*b* and magnets 52*a*, 52*b*, and 52*c* may be positioned, e.g., as shown in FIG. 3, and output shaft 18 may be rotated in the normal (forward or tightening) direction. Because, in FIG. 3, rotational angle detecting sensor 48*a* faces magnet 52*b* (i.e., its North pole is disposed outward), the detection signal of sensor 48*a* is at a HIGH level.

On the other hand, the detection signal of rotational angle detecting sensor 48*b* is at a LOW level because magnet 52*c* (i.e., its South pole is disposed outward) has passed detecting sensor 48*b*. When inner cylinder 40 rotates by angle θ from this state, magnet 52*b* (i.e., its North pole is disposed outward) faces rotational angle detecting sensor 48*b*. Therefore, the detection signal of sensor 48*b* will be switched from the LOW level to the HIGH level.

When inner cylinder 40 further rotates by angle (α−θ), magnet 52*a* will face rotational angle detecting sensor 48*a*. Therefore, the detection signal of sensor 48*a* will be switched from the HIGH level to the LOW level. In the same manner as was describe more fully above, the detection signal of sensor 48*b* is switched when output shaft 18 rotates (in the normal direction) by angle θ after the detection signal level of sensor 48*a* is switched.

Figure 5:
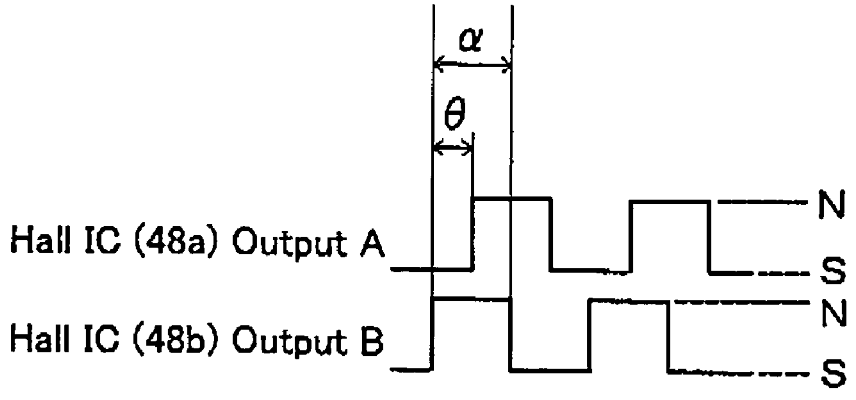
FIG. 5 is a diagram showing the timing of outputted detection signals that are respectively supplied from sensors when the output shaft is rotated in a reverse direction.

On the other hand, when output shaft 18 rotates in the reverse (or fastener loosening) direction, the detection signal of each of rotational angle detecting sensors 48*a*, 48*b* inversely changes as shown in FIG. 5. FIG. 5 shows the timings of the outputs of detection signals that are supplied from two corresponding rotational angle-detecting sensors 48*a*, 48*b* when output shaft 18 rotates in the reverse direction. As shown in FIG. 5, the detection signal of rotational angle detecting sensor 48*a* switches when output shaft 18 rotates (in the reverse direction) by angle θ after the detection signal level of sensor 48*b* switches.

As was explained above, the (voltage) level of the detection signal of each of rotational angle detecting sensor 48*a*, 48*b* is switched each time inner cylinder 40 (i.e., output shaft 18 of oil pulse unit 22) rotates by angle α. Accordingly, each sensor 48*a*, 48*b* outputs one pulse each time output shaft 18 rotates by the angle (2α). The rising edge and falling edge of each pulse may be detected by microcomputer 60 in order to detect changes in the rotational angle of output shaft 18.

Further, as is clear from FIGS. 4 and 5, pulse edges of the detection signals from rotational angle detecting sensors 48*a*, 48*b* are detected each time output shaft 18 rotates α/ 2 (because θ=α/2 in the present embodiment). As a result the minimum resolution of the change in rotational angle of output shaft 18 capable of being detected by rotational angle detecting sensors 48*a* and 48*b* is α/2.

The phases of the detection signals that are output from rotational angle detecting sensors 48*a*, 48*b* are shifted from each other by the angle θ (=α/2). Further, the shifted directions differ according to the rotating direction of output shaft 18. Therefore, the rotating direction of output shaft 18 may be determined based upon the phase shift of the detection signal output from sensors 48*a*, 48*b*.

Figures 7, 8:
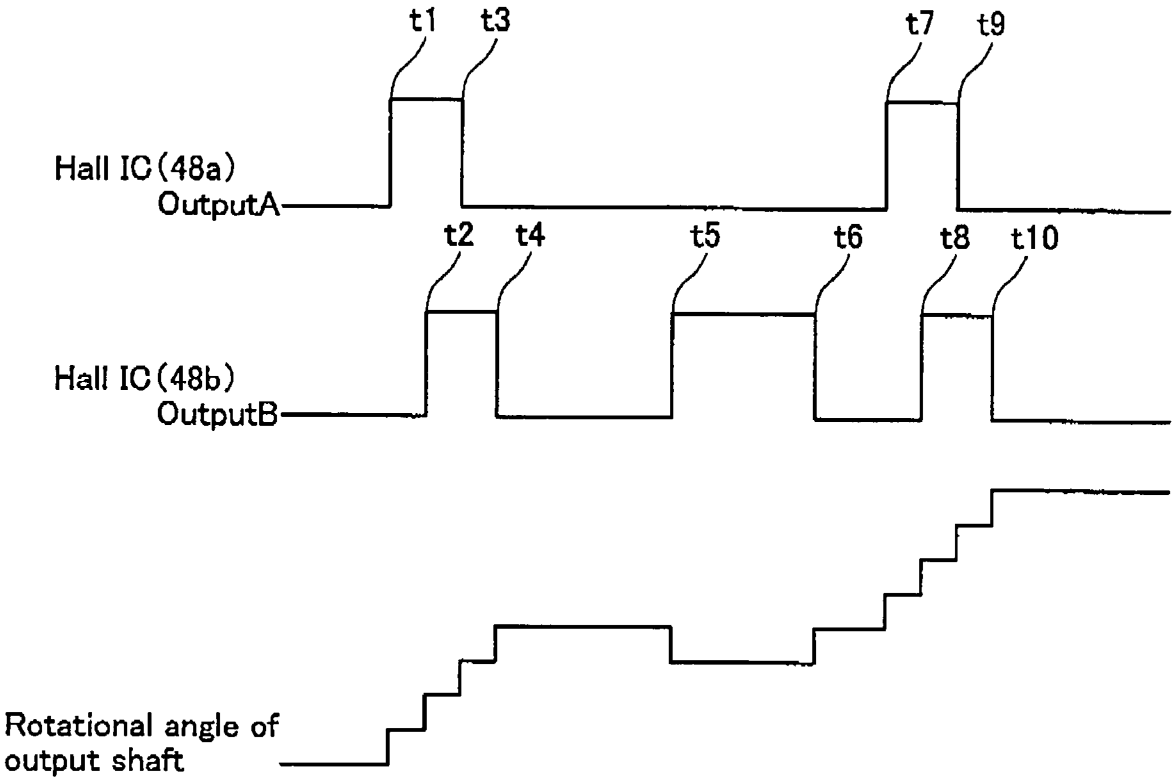
FIG. 7 is a diagram schematically showing the relationship between the detecting signals from the sensors and changes in rotational angle of the output shaft.
FIG. 8 is a representative memory structure of storage registers.

A detailed description is given as an example, wherein the detection signals shown in FIG. 7 have been output from rotational angle detecting sensors 48*a*, 48*b*. In the example shown in FIG. 7, output shaft 18 is hammering. Consequently, during the times t3 to t7, pulse edges appear only in the detection signal from rotational angle detecting sensor 48*b*.

First, the rising edge of the detection signal from rotational angle detecting sensor 48*a* is detected at the time t1. At this juncture, the direction of rotation of output shaft 18 is determined based on whether the pulse edge detected immediately prior to this pulse edge occurred in the rotational angle detecting sensor 48*a* or 48*b*. Here, suppose that the pulse edge detected immediately prior to this pulse edge was a falling edge of rotational angle detecting sensor 48*b*. Therefore, it can be determined that output shaft 18 is rotating in the direction of normal rotation, and the rotational angle of output shaft 18 increases by α/2.

Subsequently, a rising edge of the detection signal of rotational angle detecting sensor 48*b* is detected at the time t2. Thus, it can be determined that output shaft 18 is rotating in the direction of normal rotation at the time t2, and the rotational angle of output shaft 18 increases by α/2. In the same manner, it is determined that output shaft 18 is rotating in the direction of normal rotation and that the rotational angle of output shaft 18 increases by α/2 at each of the times t3 and t4.

On the other hand, the rising edge of the detection signal of rotational angle detecting sensor 48*b* is detected at the time t5. Since, relative to the time t4, the falling edge of the detection signal of rotational angle detection sensor 48*b* was detected, it can be determined that the direction of rotation of output shaft 18 has changed (i.e., it can be determined that output shaft 18 has rotated in the direction of reverse rotation). As a result, the rotational angle of output shaft 18 decreases by α/2. Similarly, it is determined at time t6 that the direction of rotation of output shaft 18 has changed and is in the direction of normal rotation, and it can be detected at times t7 to t10 that output shaft 18 is rotating in the direction of normal rotation.

In addition to the components described above, soft impact wrench 11 may include main switch 32 for starting and stopping motor M as shown in FIG. 1. Further, detachable battery pack 34 may be removably attached to a lower end of housing 13. Battery pack 34 may supply current to motor M, microcomputer 60, etc.

A representative control circuit for use with soft impact wrench 11 will now be described with reference to FIG. 6. The representative control circuit of soft impact wrench 11 utilizes microcomputer 60 as the main component. Microcomputer 60 is preferably disposed within housing 13.

Figure 6:
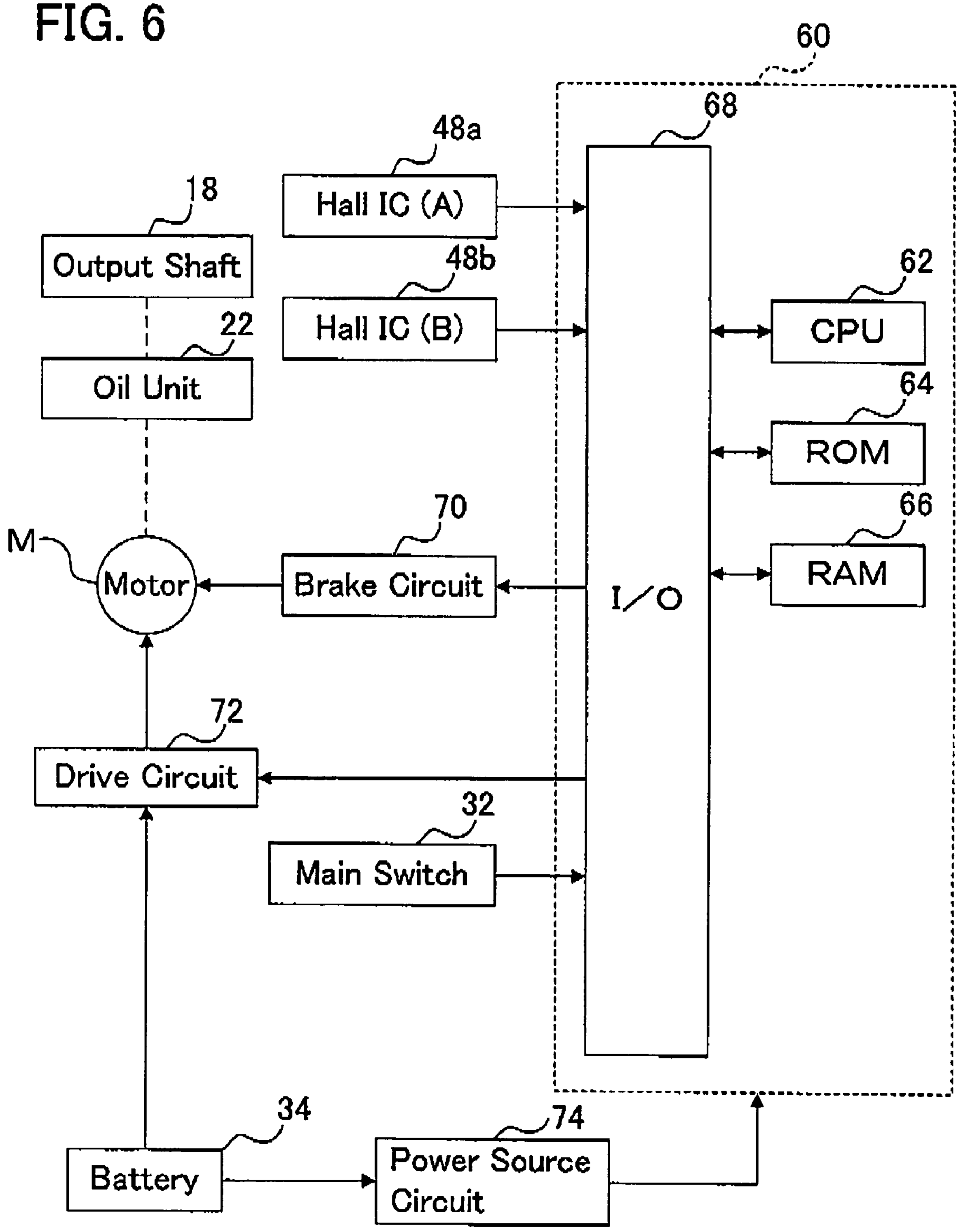
FIG. 6 is a block diagram showing a representative circuit of the right angle soft impact wrench of FIG. 1.

Microcomputer 60 may be an integrated circuit containing CPU 62, ROM 64, RAM 66 and I/O 68, and may be connected as shown in FIG. 6, ROM 64 may store a control program for automatically stopping motor M, and other programs. Rotational angle detecting sensors 48*a*, 48*b* are respectively connected to predetermined input ports of I/O 68. Thus, detection signals output from each of sensors 48, 48*b* can be input to microcomputer 60.

Battery pack 34 is connected to microcomputer 60 via power source circuit 74. Battery pack 34 may include a plurality of rechargeable battery cells (e.g., nickel metal hydride battery cells, nickel cadmium battery cells) tat are serially connected. In addition, battery pack 34 is preferably connected to motor M via drive circuit 72. Motor M is connected to microcomputer 60 via drive circuit 72 and brake circuit 70.

In such a circuit, when motor M is driven, output shaft 18 of oil pulse unit 22 rotates, and detection signals are input to microcomputer 60 from rotational angle detecting sensors 48*a*, 48*b*. Microcomputer 60 may execute a program based upon the input detection signals, stop the supply of power to motor M at a given timing, and actuate brake circuit 70 in order to stop motor M.

FIG. 8 shows a representative memory structure for RAM 66 of microcomputer 60. The pulse edge information detected by rotational angle detecting sensors 48*a*, 48*b* may be stored within storage registers R1~R10 of RAM 66. At predetermined time intervals, microcomputer 60 may detect the pulse edge from the rotational angle detecting sensors 48*a*, 48*b* and stores the pulse edge that have been detected, and the direction of rotation, in the storage registers R1~R10. Specifically, ‘01’ is stored when a pulse edge in the direction of normal rotation has been detected, ‘FF’ is stored when a pulse edge in the direction of reverse rotation has been detected, and ‘00’ is stored when no pulse edge has been detected. In the example shown in FIG. 8, output shaft 18 has rotated only one portion (i.e., α/2) in the direction of normal rotation during the period in which the pulse edges are stored in the storage registers R1~R10.

Since the intervals at which microcomputer 60 detects the pulse edges are sufficiently short (e.g., 0.2 milliseconds), no more than two pulse edges occur during one detecting time interval. Further, microcomputer 60 may be programmed to store the pulse edge information in order from register R1 to R10. Thus, microcomputer 60 may be programmed such that when pulse edge information have been stored in the entirety of the storage registers R1~R10, the information in registers R2~R10 is shifted to registers R1~R9, and new pulse edge information is stored in register R10. By this means, the oldest stored pulse edge information is cleared first.

A representative method for utilizing microcomputer 60 in order to tighten a fastener using soft impact wrench 11 will be explained with reference to the representative flowcharts of FIGS. 9–13. For example, in order to tighten a fastener using soft impact wrench 11, the operator may first insert the fastener into the socket attached to the distal end of spindle 12 and then turn ON main (trigger) switch 32. When main switch 32 is turned ON (actuated), microcomputer 60 starts the drive of motor M and also executes the representative control program, which will be discussed below.

Figure 9:
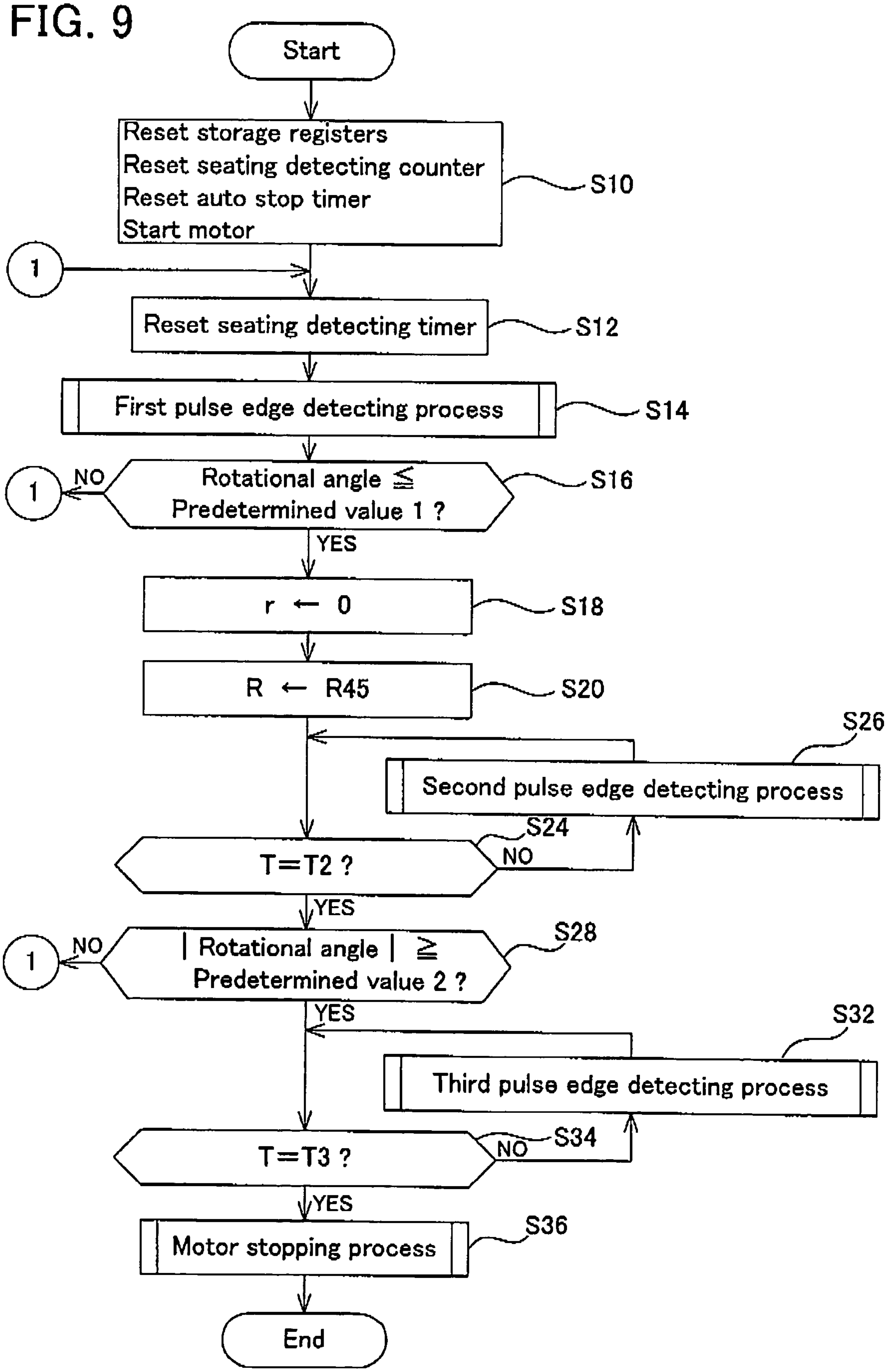
FIG. 9 is a flowchart showing a representative process for automatically stopping the motor.

As shown in FIG. 9, when main switch 32 has been turned ON, microcomputer 60 first resets: the storage registers R1~R10, a seating detecting counter C, and an auto stop timer, and then activates the motor M (step S10). The seating detecting counter C is a counter that counts the number of times it has been determined that the fastener is seated against the workpiece. The auto stop timer is a timer that determines whether to stop motor M. After the initializing processes have been performed, microcomputer 60 resets a seating detecting timer T and starts the seating detecting timer T (step S12). The seating detecting timer T is a timer required when a seating detecting process (i.e., steps S14~S34) is performed.

Figure 10:
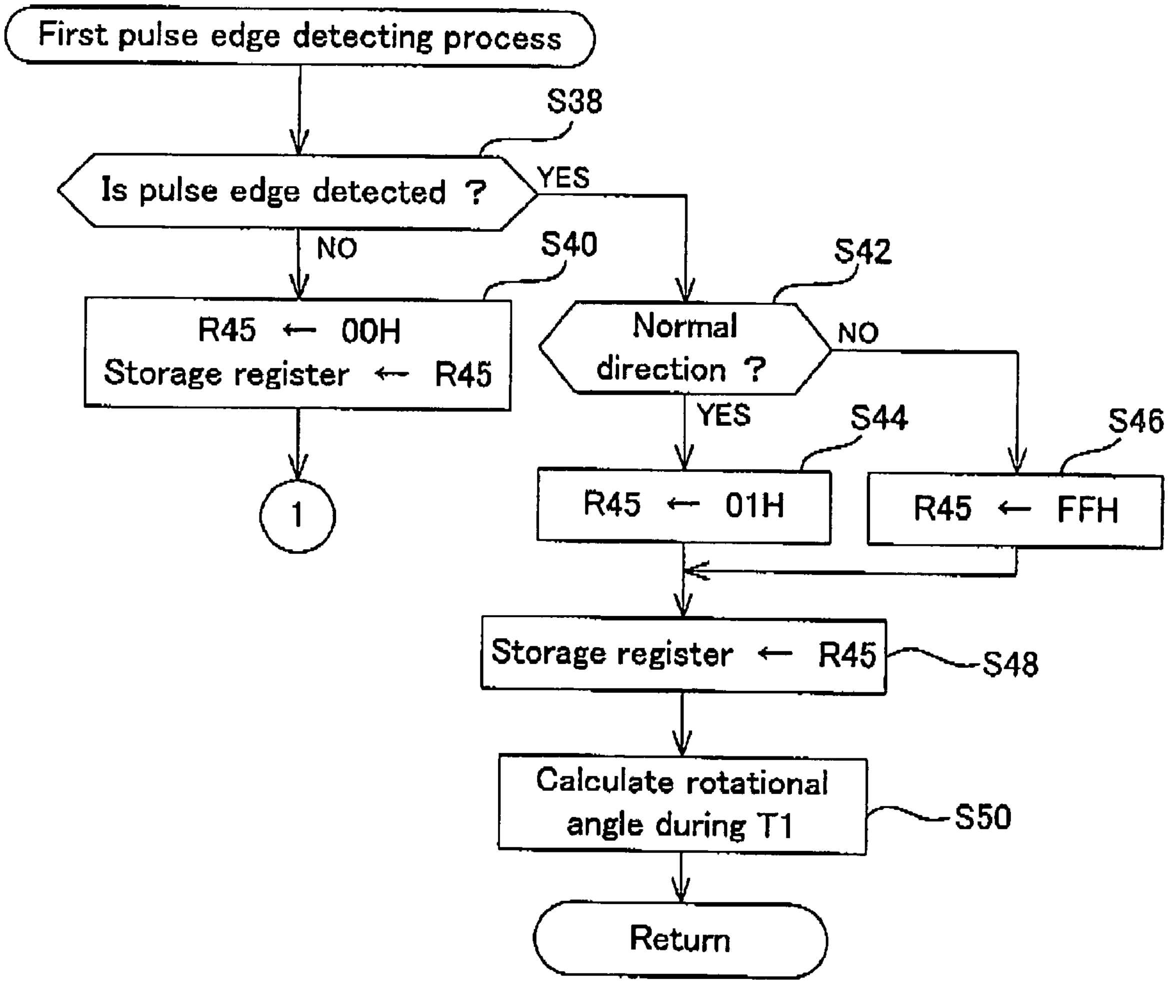
FIG. 10 shows a flowchart of a first pulse edge detecting process shown in FIG. 9.

Next, microcomputer 60 starts a first pulse edge detecting process (step S14). The first pulse edge detecting process will be described with reference to FIG. 10. In the first pulse edge detecting process, as shown in FIG. 10, microcomputer 60 determines whether a pulse edge has occurred in the detection signals from rotational angle detecting sensors 48*a*, 48*b* (step S38). If a pulse edge has not occurred (NO in step S38), ‘00’ is stored in the storage register R (step S40), the process returns to step S12 of FIG. 9.

On the other hand, if a pulse edge has occurred (YES in step S38), microcomputer 60 determines whether the pulse edge is in the direction of normal rotation or in the direction of reverse rotation (step S42). When the pulse edge is in the direction of normal rotation (YES in step S42), ‘01’ is stored in the storage register R (steps S44 and S48), and when the pulse edge is in the direction of reverse rotation (NO) in step S42), ‘FF’ is stored in the storage register R (steps S46 and S48). Subsequently, microcomputer 60 calculates the changes in the rotational angle of output shaft 18 in the direction of normal rotation (i.e., the tightening direction) during T1 (millisecond) prior to the occurrence of the pulse edge (step S50). Specifically, the pulse edges stored in the storage registers R1~R10 are added together. After step S50 has been completed, the process proceeds to step S16 in FIG. 9.

When the process proceeds to step S16, microcomputer 60 determines whether the changes in the rotational angle calculated in step S50 of FIG. 10 is equal to or less than a “predetermined value 1” (e.g., α). In the case where the changes in the rotational angle calculated in step S50 exceeds the “predetermined value 1” (NO in step S16), microcomputer 60 determines that output shaft 18 has been rotating during T1, the process returns to step S12. On the other hand, in the case where the changes in the rotational angle calculated in step S50 is equal to or less than the “predetermined value 1” (YES in step S16), microcomputer 60 determines that output shaft 18 has not been rotating during T1, and the process proceeds to step S18.

When the process proceeds to step S18, a value of variable r is set to zero. The variable r is a variable for calculating the absolute value of the changes in the rotational angle of output shaft 18 occurring during T2 (millisecond) from the time when the pulse edge occurred. In step S20, a value of variable R is set to the pulse edge detected in the first pulse edge detecting process (i.e., pulse edge information of step S44 or step S46 in FIG. 10). The variable R is a variable for calculating the changes in the rotational angle in the direction of normal rotation of output shaft 18 occurring during T3 (millisecond) from the time when the pulse edge has occurred.

When the process proceeds to step S24, microcomputer 60 determines whether the seating detecting timer T has reached T2 (millisecond). If the seating detecting timer T has reached T2 (millisecond) (YES in step S24), the process proceeds to step S28. On the other hand, if the seating detecting timer T has not reached T2 (millisecond) (NO in step S24), the process proceeds to step S26.

Figure 11:
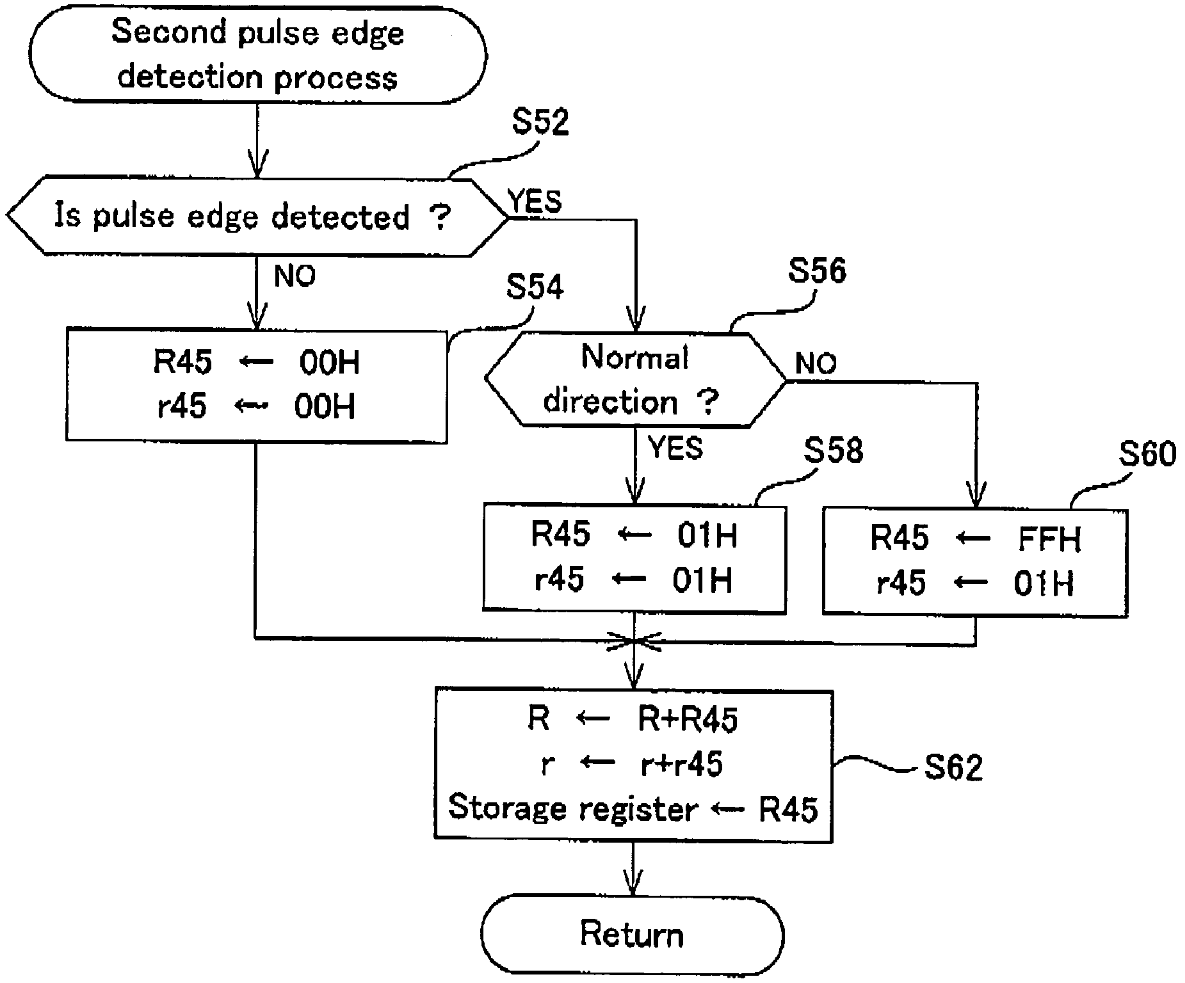
FIG. 11 shows a flowchart of a second pulse edge detecting process shown in FIG. 9.

When the process proceeds to step S26, microcomputer 60 starts a second pulse edge detecting process. The second pulse edge detecting process will be explained with reference to FIG. 11. In the second pulse edge detecting process, as shown in FIG. 11, microcomputer 60 determines whether a pulse edge has occurred in the detecting signals of rotational angle detecting sensors 48*a*, 48*b* (step S52). In the case where a pulse edge has not occurred (NO in step S52), '00' is stored in registers R45 and r45, and the process proceeds to step S62. On the other hand, in the case where a pulse edge has occurred (YES in step S52), microcomputer 60 determines whether the pulse edge is in the direction of normal rotation or in the direction of reverse rotation (step S56). When the pulse edge is in the direction of normal rotation (YES in step S56), '01' is stored in the registers R45, r45 (step S58). When the pulse edge is in the direction of reverse rotation (NO in step S56), 'FF' is stored in the register R45, and '01' is stored in the register r45 (step S60).

When the process proceeds to step S62, the value of the register R45 is added to the variable R, and the value of the register r45 is added to the variable r. By this means, the changes in the rotational angle of output shaft 18 that has been detected is added to the variable R, and the absolute value of the changes in the rotational angle of output shaft 18 that has been detected is added to the variable r. Further, the value of the register R45 is also stored in the storage register After step S62 has been completed, the process returns to step S24 of FIG. 9, and the process from step S24 is repeated. As a result the processes of steps S24 and S26 are repeated until the seating detecting timer T reaches T2 (millisecond) (i.e., until the second pulse edge detecting process is performed (T2/(detecting time interval)+1) times).

In the case where step S24 in FIG. 9 is YES, microcomputer 60 determines whether the variable r (i.e., the absolute value of the changes in the rotational angle of output shaft 18) is equal to or greater than a "predetermined value 2" (e.g., $\alpha$) (step S28). That is, it is determined whether output shaft 18 has rotated since the detection of the pulse edge in the first pulse edge detecting process at step S14. In the case where step S28 is determined to be NO, microcomputer 60 determines that the time at which the pulse edge detected in the first pulse edge detecting process occurred is not the same as the time at which the generation of the oil pulse started (i.e., when oil pulse unit 22 generated the oil pulse, the pulse edge detected in the first pulse edge detecting process did not simultaneously occur), and the process returns to step S12. In the case where step S28 is determined to be YES, microcomputer 60 determines that the time at which the pulse edge detected in the first pulse edge detecting process occurred is the same as the time at which the generation of the oil pulse started (i.e., when oil pulse unit 22 generated the oil pulse, the pulse edge detected in the first pulse edge detecting process simultaneously occurred), and the process proceeds to step S34.

In step S34, microcomputer 60 determines whether the seating detecting timer T has reached T3 (millisecond). When the seating detecting timer T has reached T3 (millisecond) (YES in step S34), the process proceeds to step S36 in which a motor stopping process is performed. When the seating detecting timer T has not reached T3 (millisecond) (NO in step S34), the process proceeds to step S32, in which a third pulse edge detecting process is performed.

Figure 12:
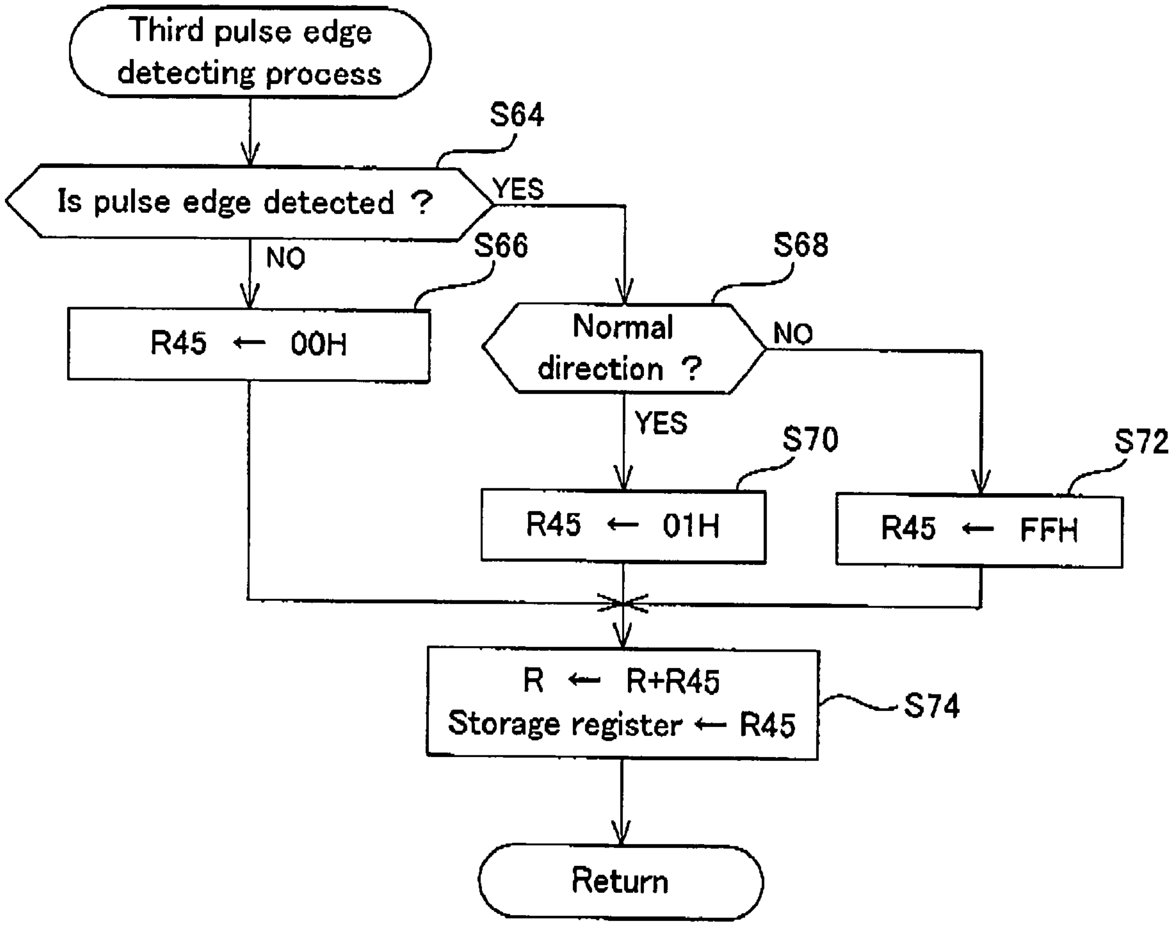
FIG. 12 shows a flowchart of a third pulse edge detecting process shown in FIG. 9.

First, the third pulse edge detecting process will be explained with reference to FIG. 12. In the third pulse edge detecting process, as shown in FIG. 12, microcomputer 60 determines whether a pulse edge has occurred in the detecting signals from rotational angle detecting sensors 48*a*, 48*b* (step S64). If a pulse edge has not occurred (NO in step S64), '00' is stored in the register R45, and the process proceeds to step S74. On the other hand, if a pulse edge has occurred (YES in step S64), it is determined whether the pulse edge is in the direction of normal rotation or in the direction of reverse rotation (step S68). In the case where the pulse edge is in the direction of normal rotation (YES in step S68), '01' is stored in the register R45 (step S70). In the case where the pulse edge is in the direction of reverse rotation (NO in step S68), 'FF' is stored in the register R45 (step S72).

When the process proceeds to step S74, the value of the register R45 is added to the variable R. By this means, the change in the rotational angle of the output shaft 18 that is detected every detecting time interval (e.g., 0.2 milliseconds) is added to the variable R. Further, in step S74, the value of the register R45 is stored in the storage registers. After step S74 has been completed, the process returns to step S34 of FIG. 9. By this means, steps S34 and S32 are repeated until the seating detecting timer T reaches T3 (millisecond) (i.e., until the third pulse edge detecting process is performed ((T3–T2)/(detecting time interval)) times).

Figure 13:
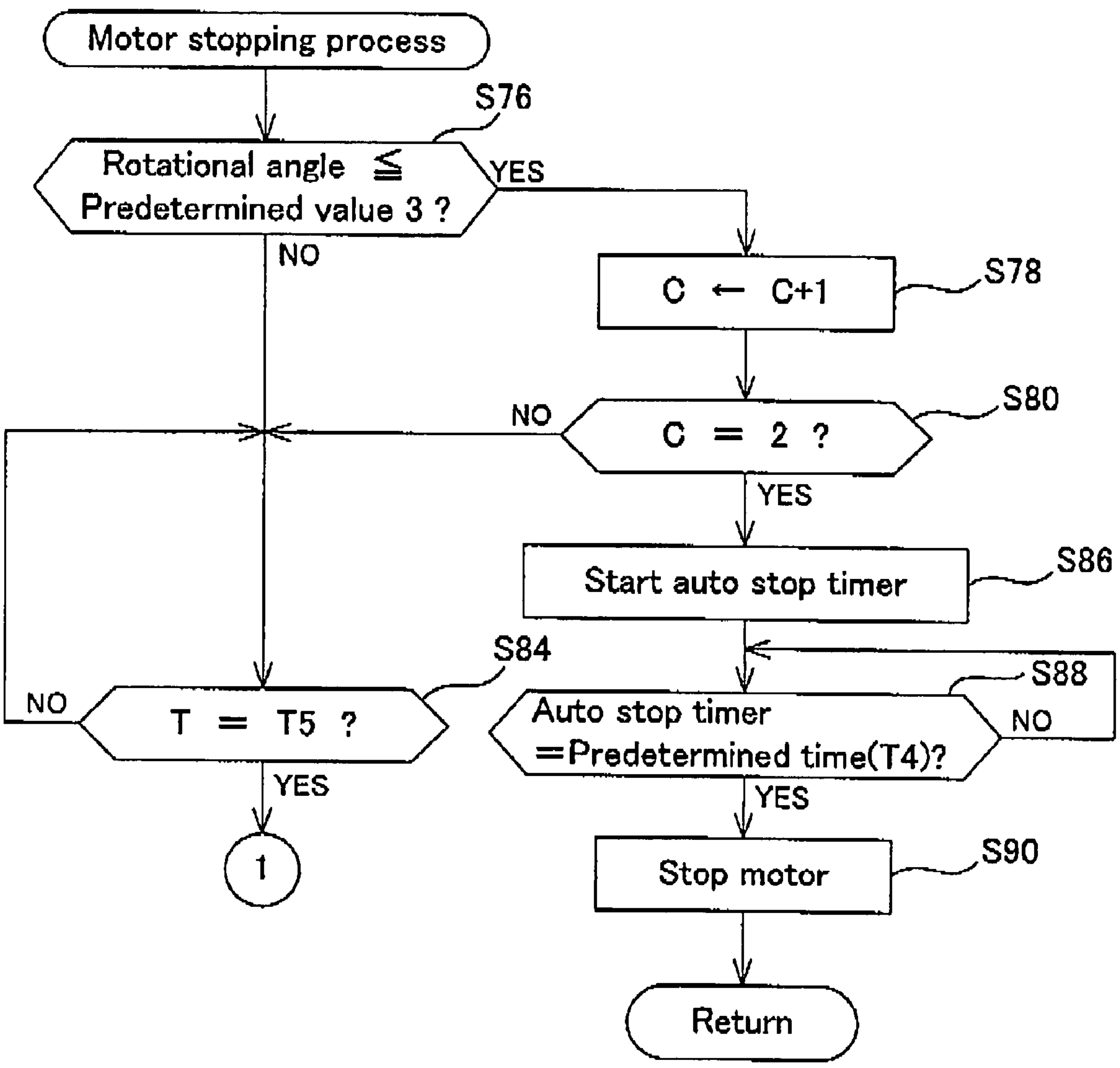
FIG. 13 shows a flowchart of a motor stopping process shown in FIG. 9.

Next, the motor stopping process of step S36 will be explained with reference to FIG. 13. As shown in FIG. 13, in the motor stopping process, microcomputer 60 determines whether the value of the variable R (i.e., the changes in the rotational angle of output shaft 18 in the direction of normal rotation during the period from detecting the pulse edge in the first pulse edge detecting process until T3 (millisecond) has elapsed) is equal to or less than a "predetermined value 3" (step S76). The "predetermined value 3" may equally well be assigned a value appropriate to the type of fastener (e.g., screw, bolt or nut) or to the type of tightening operation.

When the variable R exceeds the "predetermined value 3" (NO in step S76), it is determined that the fastener has not been seated against the workpiece, and the process proceeds to step S84. On the other hand, when the variable R is within the "predetermined value 3" (YES in step S76), it is determined that the fastener has been seated against the workpiece, and the process proceeds to step S78. That is, in the first representative embodiment, the seating of the fastener is determined by utilizing the fact that when one oil pulse (i.e., impulse force) causes output shaft 18 to rotate in the direction of normal rotation, there is a lesser changes in the rotational angle after the fastener is seated than before the fastener is seated.

When step S76 is YES, '1' is added to the seating detecting counter C (step S78), and it is determined whether the seating detecting counter C has reached '2' (step S80). If the seating detecting counter C has not reached '2' (NO in step S80), the process proceeds to step S84 so that a second seating detection is performed. If the seating detecting counter C has reached '2' (YES in step S80), microcomputer 60 starts the auto stop timer (step S86), and microcomputer 60 determines whether the auto stop timer is equal to a predetermined period T4 (millisecond) (step S88). If the auto stop timer is not equal to the predetermined period T4 (millisecond) (NO in step S88), the process waits until the auto stop timer is equal to the predetermined period T4 (millisecond). Conversely, if the auto stop timer is equal to the predetermined period T4 (millisecond) (YES in step S88), microcomputer 60 stops the motor M (step S90).

When the process proceeds to step S84, microcomputer 60 determines whether the seating detecting timer T is equal to a predetermined period T5 (millisecond) (step S84). In the case where the seating detecting timer T is not equal to the predetermined period T5 (millisecond) (NO in step S94), the process waits until the seating detecting timer T is equal to the predetermined period T5 (millisecond). In the case where the seating detecting timer T is equal to the predetermined period T5 (millisecond) (YES in step S84), the process returns to step S12 of FIG. 9. Therefore, when seating detection is performed, the next seating detection is not performed until after T5 (millisecond) has elapsed. As a result, since the next seating detection is not affected by contact occurring when seating the fastener, the seating of the fastener can be accurately detected.

As is clear from the above, in the above illustrated representative embodiment, the pulse edges of rotational angle detecting sensors 48*a*, 48*b* and the direction of rotation are detected and stored at specified time intervals in the storage registers R1~R10, whereby the moving state (i.e., halted or rotating) of output shaft 18 prior to the detection of the pulse edge is determined. Furthermore, when it is determined that output shaft 18 is halted, further determining the moving state (halted or rotating) of output shaft 18 after the detection of the pulse edge renders it possible to determine whether the time at which the pulse edge occurred was the time at which an oil pulse was generated. By this means, the rotational angle detecting sensors 48*a*, 48*b* that detect the changes in rotational angle of output shaft 18 also specify the oil pulse generation time, thereby eliminating the need for the impact detecting sensor that is conventionally required.

Second Detailed Representative Embodiment

The second representative embodiment of the present teachings will now be explained. Before proceeding with a discussion of the second representative embodiment, some additional background information is in order Generally speaking, even if same fasteners are tightened using same motor auto stop conditions (e.g., same motor driving period after seating, same number of impulse forces being generated after seating), the tightening torque of the fastener changes if the type of workpiece (e.g., the hardness of workpiece) differs. Usually, the appropriate tightening torque of the fastener is determined by the type of fastener and not by the type of workpiece, such that if the fasteners are same, the appropriate tightening torque values are same. In consequence, if same fasteners are to be tightened to differing workpiece with the appropriate tightening torque, the motor auto stop conditions must be changed to correspond to the type of workpiece. If an operator must change the motor stopping conditions, the fastener will not be tightened with the appropriate tightening torque in the case where the operator has forgotten to change the motor auto stop conditions. In order to overcome this problem of impact wrenches, an impact wrench of the second representative embodiment is capable of automatically changing the motor auto stop conditions in accordance with the type of workpiece.

Figure 15:
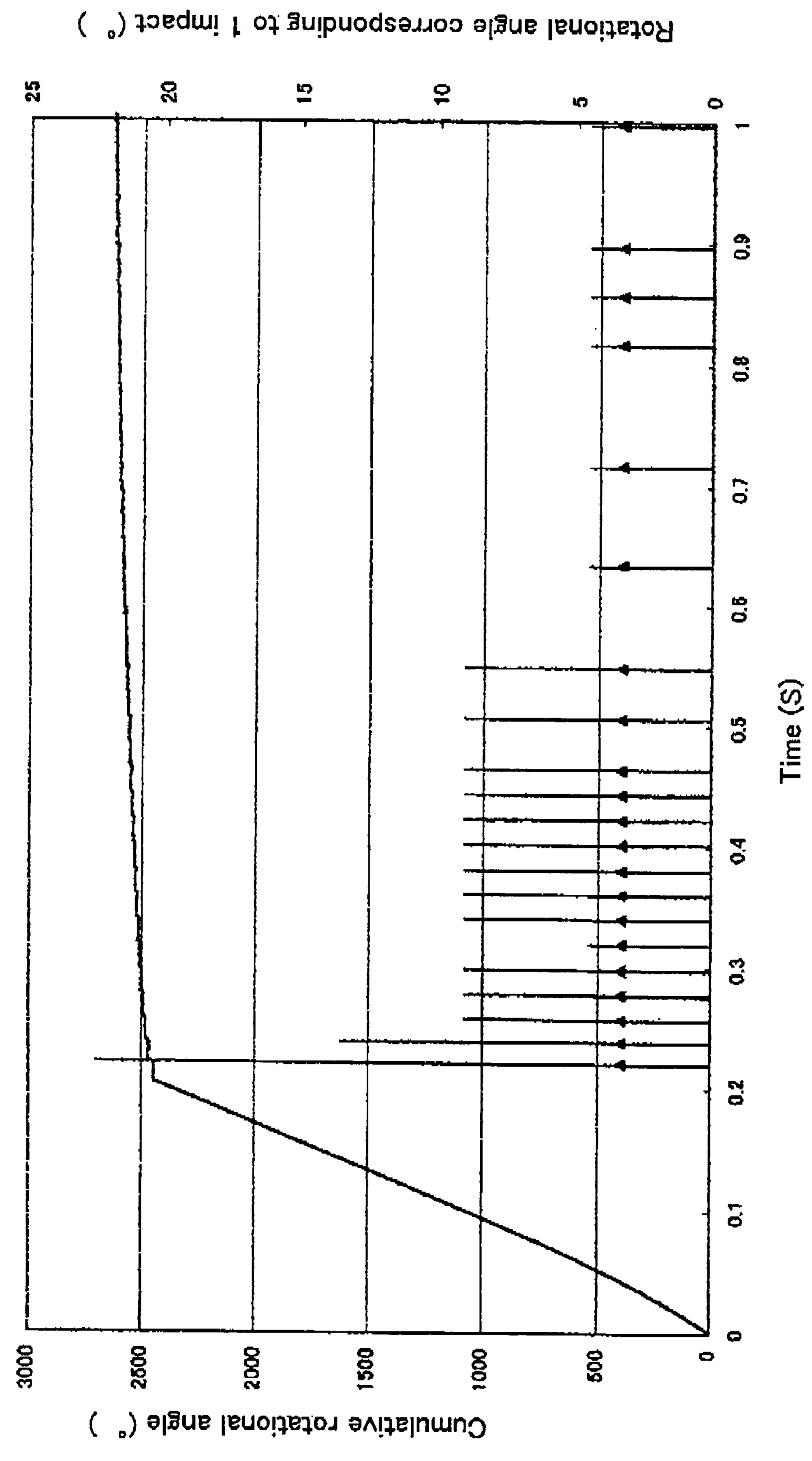
FIG. 15 is a graph showing both changes in cumulative rotational angle of the output shaft when a fastener is tightened to a hard joint member, as well as changes in rotational angle of the output shaft per 1 impulse (1 impact) after seating.
Figure 16:
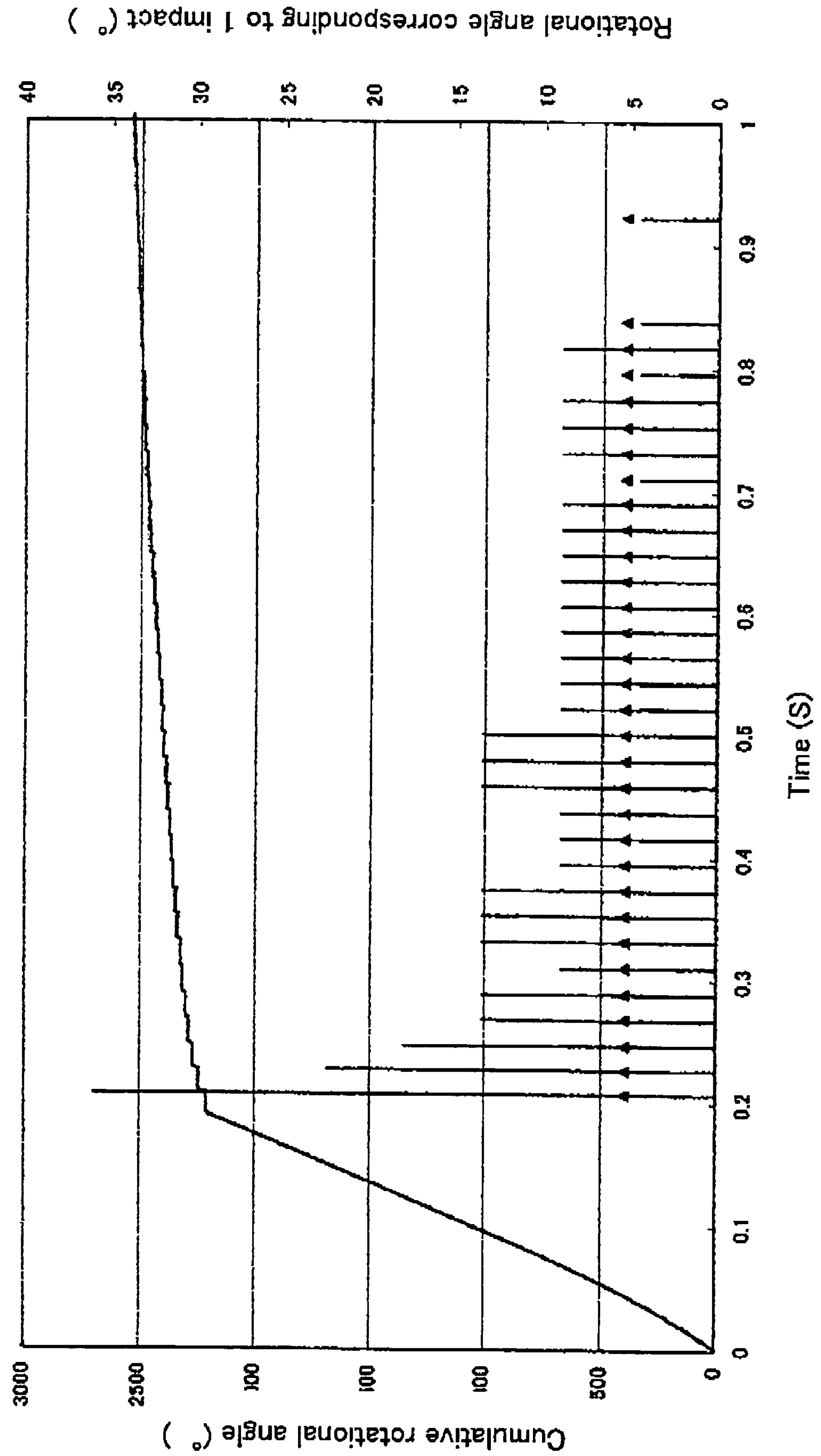
FIG. 16 is a graph showing both changes in the cumulative rotational angle of the output shaft when the fastener is tightened to a soft joint member, as well as change in rotational angle of the output shaft per 1 impulse (1 impact) after seating.
Figure 17:
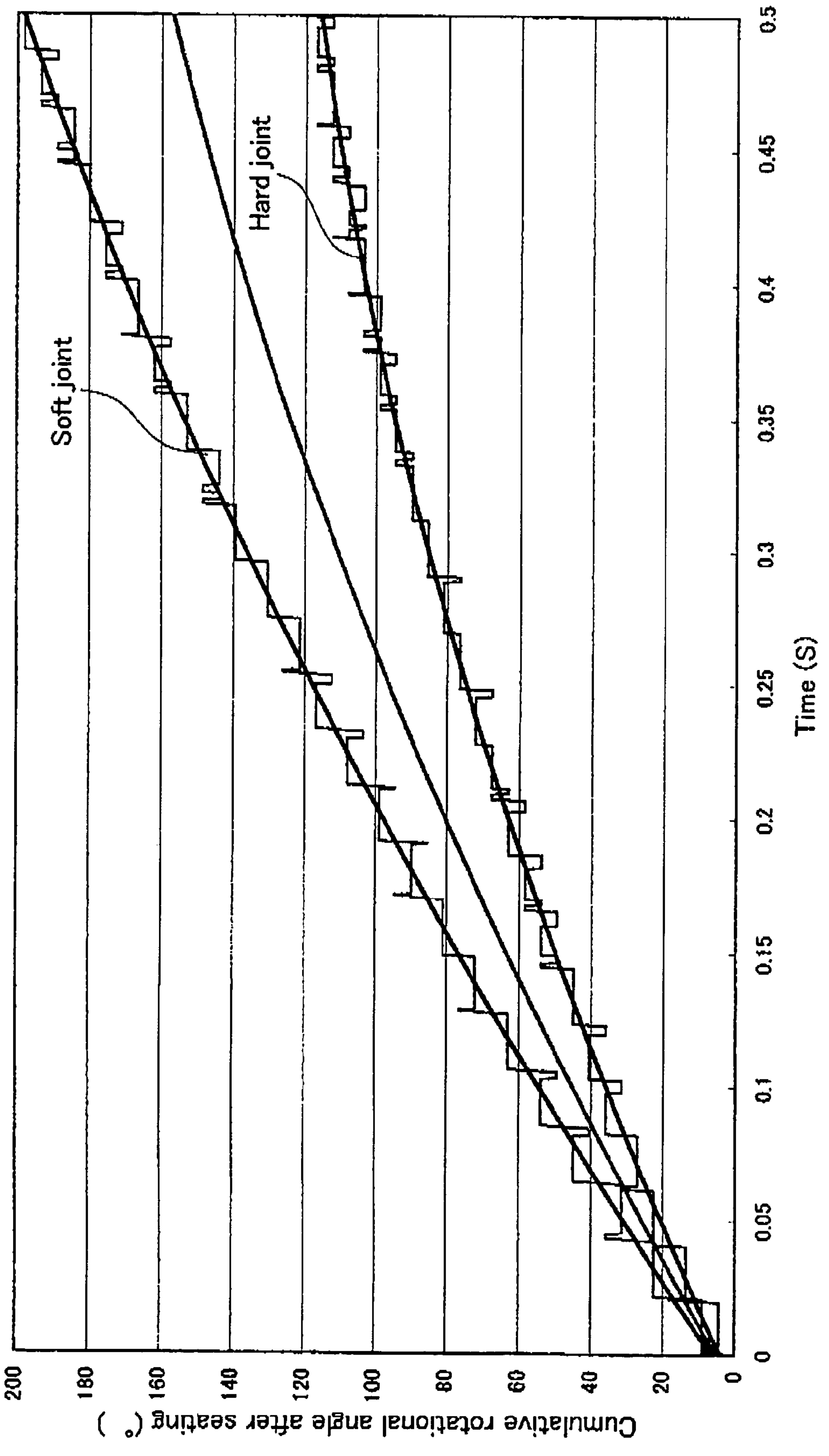
FIG. 17 is a graph showing one example of changes in the cumulative rotational angle of the output shaft after seating with respect to a hard joint member and a soft joint member.

Here, the difference in the movement conditions of the output shaft after the seating of the fastener as a result of the difference in the type of workpiece will be explained in detail with reference to FIGS. 15 to 17. FIG. 15 shows both changes in a cumulative rotational angle of the output shaft when a screw is tightened to a hard member such as steel (hereafter referred to as hard joint member), as well as changes in rotational angle of the output shaft per 1 impulse force after seating. FIG. 16 shows both changes in the cumulative rotational angle of the output shaft when a screw is tightened to a soft member such as wood (hereafter referred to as soft joint member), as well as changes in rotational angle of the output shaft per 1 impulse force after seating. FIG. 17 shows the change in the cumulative rotational angle of the output shaft after seating for the cases of the hard joint member and the soft joint member.

As shown in FIGS. 15 to 17, the changes in the cumulative rotational angle of the output shaft are approximately identical prior to seating for both cases. However, the changes in the cumulative rotational angle of the output shaft differ greatly after seating. With the hard joint member, there are small changes in the rotational angle of the output shaft per 1 impulse, the screw hardly rotating after seating. By contrast with the soft joint member, there are large changes in the rotational angle of the output shaft per 1 impulse, and the screw rotates even after seating. As a result, it is possible to determine whether the workpiece is a hard joint member or a soft joint member on the basis of a value obtained by finding the changes in the cumulative rotational angle of the output shaft (or, the changes in rotational angle of the output shaft per 1 impulse) from the change in the rotational angle of the output shaft and the direction of rotation thereof, this being detected by the rotational angle detecting sensors. Thereupon, the motor can be stopped using the hard joint member auto stop conditions if the workpiece is a hard joint member, and can be stopped using the soft joint member auto stop conditions if the workpiece is a soft joint member. For example, after the microprocessor has determined that the screw has been seated, the microprocessor can be programmed to: firstly (1) calculate, from the changes in the rotational angle of the output shaft and the direction of rotation thereof detected by the rotational angle detecting sensors, the cumulative rotational angle of the output shaft in the tightening direction occurring within a specified period, (2) determine the type of workpiece on the basis of the calculated cumulative rotational angle, and (3) stop the motor when the automatic stopping conditions corresponding to the type of workpiece that was identified have been fulfilled. Moreover, the type of workpiece (e.g., hard joint member or soft joint member) can be determined on the basis of various indices other than the aforementioned cumulative rotational angle of the output shaft.

The second representative embodiment provides an impact wrench for two types of workpieces (i.e., hard joint members (e.g., metal plates) and soft joint members (e.g., wooden boards). Specifically, hard joint member motor auto stop conditions (wherein a motor driving period after seating is $T_{s1}$) and soft joint member motor auto stop conditions (wherein a motor driving period after seating is $T_{s2}$. (Here, $T_{s2}>T_{s1}$)) are stored in ROM 64 of microcomputer 60. Further, microcomputer 60 determines whether the workpiece to which the fastener is to be tightened is a hard joint member or a soft joint member, this driving motor M for the motor driving period $T_{s1}$ after seating in the case where the workpiece is a hard joint member, and driving motor M for the motor driving period $T_{s2}$ after seating in the case where the workpiece is a soft joint member.

The mechanical structure and composition of the control circuit may be generally the same as the soft impact wrench of the first representative embodiment Therefore, the same reference numerals will be used and the explanation of the same or similar parts may be omitted.

In the second representative embodiment, microcomputer 60 performs the processes shown in the flowchart of FIG. 9. Further, the first pulse edge detecting process (FIG. 10), the second pulse edge detecting process (FIG. 11), and the third pulse edge detecting process (FIG. 12) are performed in a manner identical to the first representative embodiment However, in the second representative embodiment, the motor stopping process shown at step S36 in FIG. 9 differs from the motor stopping process of the first embodiment.

Below, the motor stopping process of the second representative embodiment will be explained with reference to the flowchart of FIG. 14.

Figure 14:
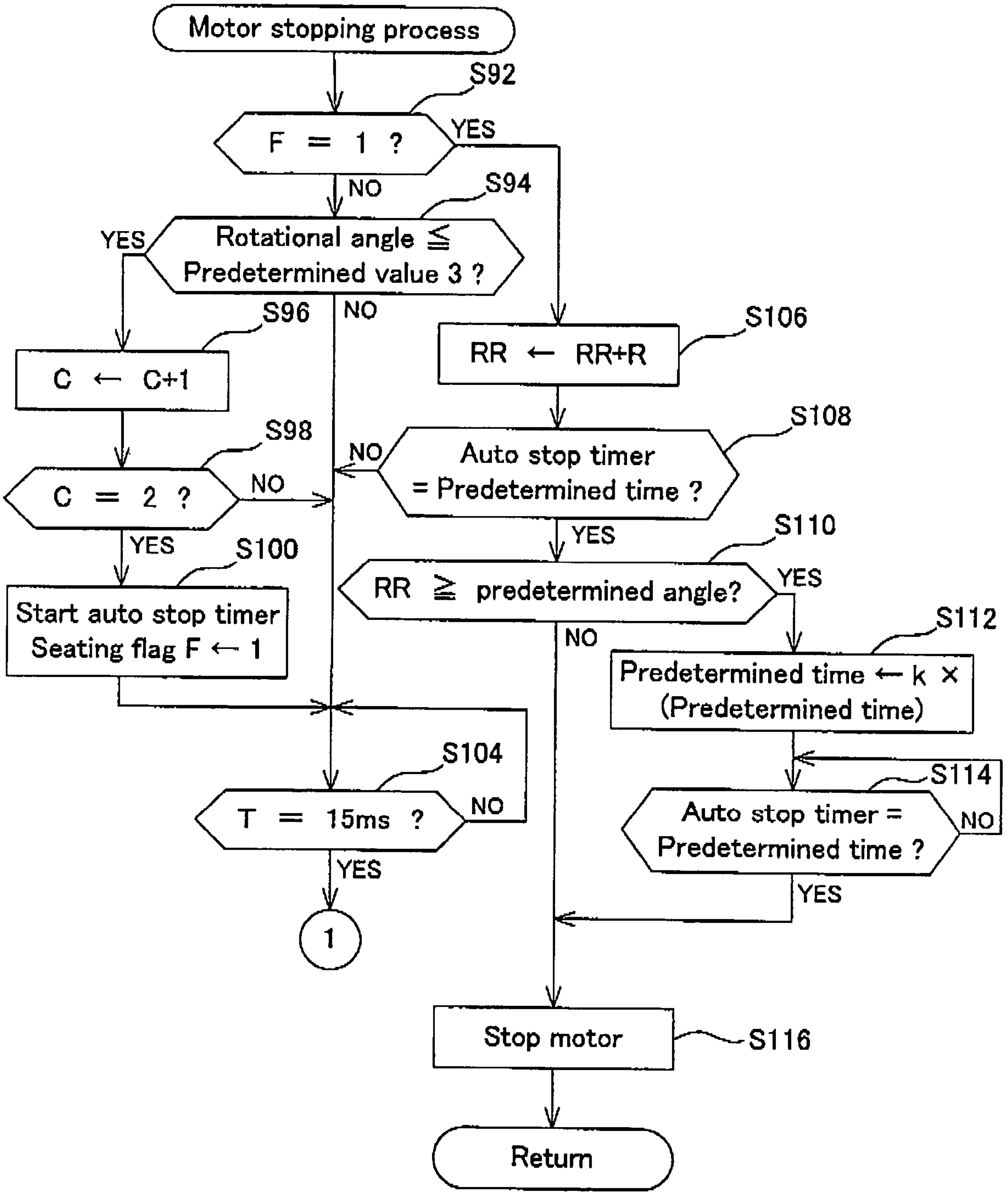
FIG. 14 shows a flowchart of a motor stopping process according to a second representative embodiment of the present teachings.

As shown in FIG. 14, in the motor stopping process of the second representative embodiment, microcomputer 60 determines whether a seating detecting flag F has reached '1' (step S92). The seating detecting flag P is a flag for showing whether the fastener is seated, this being '1' when the fastener is seated, and '0' when the fastener is not seated. Moreover, since the seating detecting flag F is cleared in the initializing processes of step S10 in FIG. 9, step S92 must be NO in the first performance of the motor stopping process after motor M has been activated.

When the seating detecting flag F is not '1' (NO in step S92), the process proceeds to step S94, and microcomputer 60 determines whether the value of the variable R (i.e., the changes in the rotational angle of output shaft 18 in the direction of normal rotation during the period from detecting the pulse edge in the first pulse edge detecting process until T5 (millisecond) has elapsed) is equal to or less than the "predetermined value 3". If the variable R exceeds the "predetermined value 3" (NO in step S94), microcomputer 60 determines that the fastener is not seated, and the process proceeds to step S104. If the variable R is within the "predetermined value 3" (YES in step S94), it is determined that the fastener is seated, and the process proceeds to step S96.

In step S96, '1' is added to the seating detecting counter C, and microcomputer 60 subsequently determines whether the seating detecting counter C has reached '2' (step S98). When the seating detecting counter C has not reached '2' (NO in step S98), the process proceeds to step S14. When the seating detecting counter C has reached '2' (YES in step S98), the seating detecting flag F is '1', the auto stop timer is started (step S100), and the process proceeds to step S104.

In step S104, microcomputer 60 determines whether the seating detecting timer T is equal to 15 milliseconds (step S104). In the case where the seating detecting timer T is not equal to 15 milliseconds (NO in step S104), the process waits until the seating detecting timer T is equal to 15 milliseconds. In the case where the seating detecting timer T is equal to 15 milliseconds (YES in step S104), the process returns to step S12 of FIG. 9, and the process from step S12 is repeated. By this means, in the second embodiment, the process returns to step S12 of FIG. 9 and performs the process from step S12 even after the auto stop timer has started.

In the case where step S92 is YES (i.e, the seating detecting flag F is '1' and the auto stop timer has started), the value of the variable R (i.e., the changes in the rotational angle of output shaft 18 in the direction of normal rotation during the period from detecting the pulse edge in the first pulse edge detecting process until the present time) is added to a variable RR (step S106), and microcomputer 60 determines whether the auto stop timer has reached a "predetermined period" (step S108). The "predetermined period" of step S108 may be the hard joint member motor driving period $T_{s1}$.

In the case where the auto stop timer has not reached the "predetermined period" (NO in step S108), the process proceeds to step S104. As a result, the process from step S12 of FIG. 9 is repeated, and the changes in the rotational angle of output shaft 18 in the direction of normal rotation is stored in the variable RR after the fastener has been seated. On the other hand, in the case where the auto stop timer has reached the "predetermined period" )YES in step S108), the process proceeds to step S110.

In step S110, microcomputer 60 determines whether the variable RR (i.e., the changes in the rotational angle of output shaft 18 in the direction of normal rotation during the period from detection of seating until the "predetermined period" has elapsed) is equal to or more than a "predetermined angle" (step S110). When the variable RR is less than the "predetermined angle" (NO in step S110), microcomputer 60 determines that the workpiece to which tightening is being performed is a hard joint member, and microcomputer 60 stop motor M (step S116). Alternatively, when the variable RR is equal to or greater than the "predetermined angle" (YES in step S110), microcomputer 60 determines that the workpiece to which tightening is being performed is a soft joint member, and the "predetermined period" (i.e., the hard joint member motor driving period $T_{s1}$) is multiplied by k (K>1) (step S112). That is, the "predetermined period" for the soft joint member changes to the motor driving period $T_{s2}$. Then, the process waits until the auto stop timer reaches the 'predetermined period' for the soft joint member (step S114), and when the auto stop timer reaches the "predetermined period" for the soft joint member, microcomputer 60 stop motor M (step S116).

As is clear from the above, in the second representative embodiment, the changes in the rotational angle of the output shaft 18 (e.g., cumulative rotational angle) after the detection of seating is calculated, and the changes in the rotational angle that has been calculated is compared with a threshold value. When the calculated changes in the rotational angle are equal to or greater than the threshold value, it is determined that the workpiece to which the tightening operation is performed is a soft joint member. On the other hand, when the calculated changes in the rotational angle are less than the threshold value, it is determined that the workpiece to which the tightening operation is performed is a hard joint member. Then, in the case where the workpiece is determined to be the hard joint member, the motor is driven for the motor driving period $T_{s1}$ after seating, and in the case where the workpiece is determined to be the soft joint member, the motor is driven for the motor driving period $T_{s2}$ after seating. By this means, the motor driving period after seating changes automatically according to the type of workpiece, thereby allowing the fastener to be tightened with a suitable tightening torque even though the type of workpiece differs.

In the second representative embodiment it is determined whether the workpiece is a hard joint member or a soft joint member on the basis of the changes in the rotational angle of the output shaft in the direction of normal rotation. However, it is equally possible to determine the type of workpiece on the basis of, for example, a value obtained by calculating the changes in the rotational angle of the output shaft in the direction of normal rotation that occurs with each oil pulse (or the average changes in the rotational angle per one oil pulse).

Figure 18:
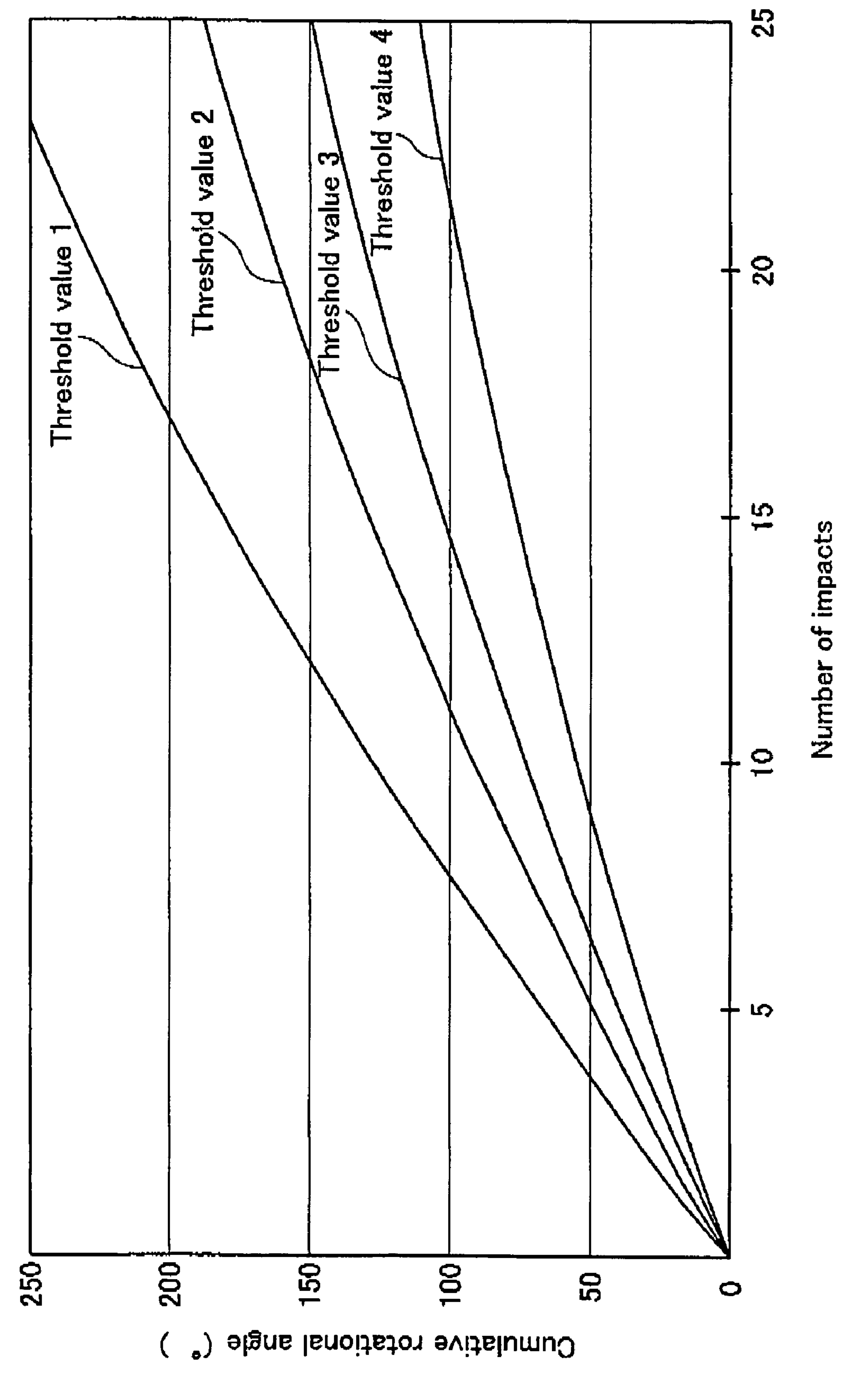
FIG. 18 is a graph showing one example of threshold values of the second representative embodiment.

Further, in the second representative embodiment there are two types of workpiece to which the fastener is tightened: a hard joint member and a soft joint member However, the workpieces to which the fastener is tightened are not limited to two types. For example, as shown in FIG. 18, it is possible to provide a plurality of threshold values with which the cumulative rotational angle of the output shaft is compared, whereby the fastener can be tightened to three or more types of workpiece by means of comparing the cumulative rotational angle of the output shaft with this plurality of threshold values. In the example shown in FIG. 18, "workpiece 1" is determined in the case where the cumulative rotational angle of the output shaft is less than a threshold value 4, "workpiece 2" is determined in the case where the cumulative rotational angle of the output shaft is from the threshold value 4 to a threshold value 3, "workpiece 3" is determined in the case where the cumulative rotational angle of the output shaft is from the threshold value 3 to a threshold value 2, "workpiece 4" is determined in the case where the cumulative rotational angle of the output shaft is from the threshold value 2 to the threshold value 1, and "workpiece 5" is determined in the case where the cumulative rotational angle of the output shaft is equal to or greater than the threshold value 1. As long as the type of workpiece can be determined, the motor may be stopped using motor auto stop conditions corresponding thereto.

The above illustrated representative embodiments provide an example of the application of the present teaching to soft impact wrench. However, the present teachings can also be applied to other power tools in which the motor stops running when the total number of oil pulses after seating is counted and equal to a predetermined setting value.

Although the power tools according to the above representative embodiments generate an impact by oil pulse unit 22, the present teachings can also be applied to other impact tools, such an impact screwdrivers, which generate an impact by hammer striking anvil (i.e., output shaft).

Finally, although the preferred representative embodiment has been described in detail, the present embodiment is for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

What is claimed is:

1. A power tool adapted to tighten a fastener, comprising:

a motor, means for generating an elevated torque, wherein the elevated torque generating means is coupled to the motor and has output shaft, wherein if a load acting on the output shaft is less than a predetermined value, rotating torque generated by the motor is directly transmitted to the output shaft and if a load acting on the output shaft exceeds the predetermined value, an elevated torque is generated by the elevated torque generating means and applied to the output shaft, a load shaft connected to the output shaft, means for detecting change in rotational angle of either the output shaft or the load shaft and the direction of rotation thereof, a memory for storing a state of either output shaft or the load shaft detected by the detecting means, and a processor in communication with the motor, the detecting means and the memory, the detecting means communicating signals corresponding to the state of either the output shaft or the load shaft to the processor, wherein the processor stores the state of either the output shaft or the load shaft in the memory at predetermined interval, and wherein the processor determines, based upon the stored state of either the output shaft or the load shaft, when the elevated torque generating means generates the elevated torque.

2. A power tool as in claim 1, wherein the means for generating an elevated torque comprises:

an anvil, and a hammer coupled to the motor, the hammer being adapted to strike the anvil to thereby rotate the anvil and generate the elevated torque.

3. A power tool as in claim 1, wherein the means for generating an elevated torque comprises an oil pulse unit.

4. A power tool as in claim 1,wherein the detecting means comprises:

a plurality of magnets disposed around an outer surface of either the output shaft or the load shaft so that the magnets integrally rotate with the output shaft or the load shaft, each magnet having a South pole and a North pole, wherein the South poles are disposed in an alternating relationship with the North poles, a first sensor fixedly disposed relative to the magnets, such that the first sensor will not rotate when the output shaft or load shaft rotates, wherein the first sensor latches its output signal to a first level when detecting a North pole magnetic field, and latches its output signal to a second level when detecting a South pole magnetic field, and a second sensor fixedly disposed relative to the magnets, such that the second sensor will not rotate when the output shaft or load shaft rotates, wherein the second sensor latches its output signal to the first level when detecting the North pole magnetic field, and latches its output signal to the second level when detecting the South pole magnetic field, wherein the output signal of the first sensor and the output signal of the second sensor are shifted by first phase when the output shaft or load shaft rotates in a direction of tightening a fastener, and are shifted by second phase when the output shaft or load shaft rotates in a direction of loosening the fastener.

5. A power tool as in claim 1, wherein the detecting means comprises an encoder.

6. A power tool as in claim 1, wherein the processor further (1) calculates the changes in the rotational angle of either the output shaft or the load shaft in the tightening direction from the determined generating time until a predetermined period has elapsed, and (2) determines whether the fastener has reached a seated position against the workpiece based upon the calculated changes in the rotational angle.

7. A power tool as in claim 6, wherein the processor stops the motor when a predetermined time has elapsed after determining that the fastener has reached the seated position against the workpiece.

8. A power tool as in claim 6, wherein the processor stops the motor after a first predetermined time has elapsed from a time when the processor has determined, for a predetermined number of times, that the fastener has reached the seated position against the workpiece.

9. A power tool as in claim 8, wherein the processor does not determine that the fastener has reached the seated position against the workpiece during a second predetermined time elapsing from a time when the processor determined the fastener to reach the seated position against the workpiece.

10. A power tool as in claim 6, wherein the processor stops the motor after the means for generating an elevated torque has generated the elevated torque for a predetermined number of times from a time when the processor determined the fastener to reach the seated position against the workpiece.

11. A power tool as in claim 1, wherein (1) at the time when change in the rotational angle of either the output shaft or the load shaft has occurred, the processor calculates the changes in the rotational angle of the output shaft or the load shaft in the tightening direction during a first predetermined period extending from a time prior to the change in the rotational angle until the change in the rotational angle occurs, (2) when the calculated changes in the rotational angle is within a first predetermined value, the processor further calculates the absolute value of the changes in the rotational angle of either the output shaft or the load shaft in a period lasting from the change in the rotational angle until a second predetermined period has elapsed, and (3) when the absolute value of the changes in the rotational angle is greater than a second predetermined value, the processor determines that the time of occurrence of the change in the rotational angle is the generating time.

12. A power tool as in claim 11, wherein the processor further (1) calculates the changes in the rotational angle of either the output shaft or the load shaft in the tightening direction from the determined generating time until a third predetermined period has elapsed, and (2) determines that the fastener has reached a seated position against the workpiece when the calculated changes during the third predetermined period is within the third predetermined value.

13. A power tool adapted to tighten a fastener, comprising:

a motor, means for generating an elevated torque, wherein the elevated torque generating means is coupled to the motor and has output shaft, wherein if a load acting on the output shaft is less than a predetermined value, rotating torque generated by the motor is directly transmitted to the output shaft and if a load acting on the output shaft exceeds the predetermined value, an elevated torque is generated by the elevated torque generating means and applied to the output shaft, a load shaft connected to the output shaft, means for detecting change in rotational angle of either the output shaft or the load shaft and the direction of rotation thereof, a memory storing automatic stopping programs for automatically stopping the motor for each of differing types of workpiece, and a processor in communication with the motor, the detecting means and the memory, the detecting means communicating signals corresponding to the state of either the output shaft or the load shaft to the processor, wherein the processor (1) determining the type of workpiece based upon the signals from the detecting means, and (2) selecting the automatic stopping program based upon the determined type of workpiece, and (3) stopping the motor in accordance with the selected automatic stopping program.

14. A power tool as in claim 13, wherein the processor (1) calculates a cumulative rotational angle of either the output shaft or the load shaft in the tightening direction within a predetermined period after the fastener has reached the seated position against the workpiece, and (2) determines the type of workpiece based upon the calculated cumulative rotational angle.

15. A power tool as in claim 13, wherein the processor (1) calculates average changes in rotational angle of either the output shaft or the load shaft in the tightening direction per one elevated torque after the fastener has reached the seated position against the workpiece, and (2) determines the type of workpiece based upon the calculated average changes.

16. A power tool adapted to tighten a fastener, comprising:

a motor, means for generating an elevated torque, wherein the elevated torque generating means is coupled to the motor and has output shaft, wherein if a load acting on the output shaft is less than a predetermined value, rotating torque generated by the motor is directly transmitted to the output shaft and if a load acting on the output shaft exceeds the predetermined value, an elevated torque is generated by the elevated torque generating means and applied to the output shaft, wherein the means for generating an elevated torque comprises an oil pulse unit, a load shaft connected to the output shaft, means for detecting change in rotational angle of either the output shaft or the load shaft and the direction of rotation thereof, a memory for storing a state of either output shaft or the load shaft detected by the detecting means, and a processor in communication with the motor, the detecting means and the memory, the detecting means communicating signals correspond to the state of either the output shaft or the load shaft to the processor, wherein the processor stores the state of either the output shaft or the load shaft in the memory at predetermined interval, and wherein the processor determines a generating time, at which the means for generating an elevated torque generates the elevated torque, based upon the state of either the output shaft or the load shaft stored in the memory.

17. A power tool adapted to tighten a fastener, comprising:

a motor, means for generating an elevated torque, wherein the elevated torque generating means is coupled to the motor and has output shaft, wherein if a load acting on the output shaft is less than a predetermined value, rotating torque generated by the motor is directly transmitted to the output shaft and if a load acting on the output shaft exceeds the predetermined value, an elevated torque is generated by the elevated torque generating means and applied to the output shaft, a load shaft connected to the output shaft, means for detecting change in rotational angle of either the output shaft or the load shaft and the direction of rotation thereof, a memory for storing a state of either output shaft or the load shaft detected by the detecting means, and a processor in communication with the motor, the detecting means and the memory, the detecting means communicating signals correspond to the state of either the output shaft or the load shaft to the processor, wherein the processor stores the state of either the output shaft or the load shaft in the memory at predetermined interval, and wherein the processor determines a generating time, at which the means for generating an elevated torque generates the elevated torque, based upon the state of either the output shaft or the load shaft stored in the memory, wherein (1) at the time when change in the rotational angle of either the output shaft or the load shaft has occurred, the processor calculates the changes in the rotational angle of the output shaft or the load shaft in the tightening direction during a first predetermined period extending from a time prior to the change in the rotational angle until the change in the rotational angle occurs, (2) when the calculated changes in the rotational angle is within a first predetermined value, the processor further calculates the absolute value of the changes in the rotational angle of either the output shaft or the load shaft in a period lasting from the change in the rotational angle until a second predetermined period has elapsed, and (3) when the absolute value of the changes in the rotational angle is greater than a second predetermined value, the processor determines that the time of occurrence of the change in the rotational angle is the generating time.

18. A power tool as in claim 17, wherein the processor further (1) calculates the changes in the rotational angle of either the output shaft or the load shaft in the tightening direction from the determined generating time until a third predetermined period has elapsed, and (2) determines that the fastener has reached a seated position against the workpiece when the calculated changes during the third predetermined period is within the third predetermined value.

* * * * *